(12) United States Patent
Singh et al.

(10) Patent No.: US 11,152,151 B2
(45) Date of Patent: *Oct. 19, 2021

(54) CROSSOVER COIL STRUCTURE FOR WIRELESS TRANSMISSION

(71) Applicant: NuCurrent, Inc., Chicago, IL (US)

(72) Inventors: Vinit Singh, Austin, TX (US); Ajit Rajagopalan, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/989,776

(22) Filed: May 25, 2018

(65) Prior Publication Data

US 2018/0343038 A1 Nov. 29, 2018

Related U.S. Application Data

(60) Provisional application No. 62/511,688, filed on May 26, 2017.

(51) Int. Cl.
*H01F 27/42* (2006.01)
*H01F 37/00* (2006.01)
(Continued)

(52) U.S. Cl.
CPC ......... *H01F 38/14* (2013.01); *H01F 27/2804* (2013.01); *H01F 27/2885* (2013.01);
(Continued)

(58) Field of Classification Search
CPC ...... H04B 5/0037; H04B 5/02; H04B 5/0081; H04B 5/0031; H04B 5/0093;
(Continued)

(56) References Cited

U.S. PATENT DOCUMENTS 2,797,393 A    6/1957   Clogston
2,911,605 A   11/1959   Wales, Jr.
(Continued)

FOREIGN PATENT DOCUMENTS

CN     2650300 Y    10/2004
CN    103944196      7/2014
(Continued)

OTHER PUBLICATIONS

Ex. 1013—U.S. Pat. No. 6,432,497 to Bunyan, 12 pages.
(Continued)

*Primary Examiner* — Hal Kaplan
*Assistant Examiner* — Rasem Mourad
(74) *Attorney, Agent, or Firm* — Lee Sullivan Shea & Smith LLP

(57) ABSTRACT

Various embodiments of inductor coils, antennas, and transmission bases configured for wireless electrical energy transmission are provided. These embodiments are configured to wirelessly transmit or receive electrical energy or data via near field magnetic coupling. The embodiments of inductor coils comprise a figure eight configuration that improve efficiency of wireless transmission efficiency. The embodiments of the transmission base are configured with at least one transmitting antenna and a transmitting electrical circuit positioned within the transmission base. The transmission base is configured so that at least one electronic device can be wirelessly electrically charged or powered by positioning the at least one device in contact with or adjacent to the transmission base.

25 Claims, 31 Drawing Sheets

(51) Int. Cl.
| | |
|---|---|
| *H01F 38/00* | (2006.01) |
| *H01F 38/14* | (2006.01) |
| *H04B 5/00* | (2006.01) |
| *H02J 50/12* | (2016.01) |
| *H01F 27/28* | (2006.01) |
| *H01Q 7/04* | (2006.01) |
| *H02J 50/70* | (2016.01) |
| *H02J 50/40* | (2016.01) |
| *H02J 50/23* | (2016.01) |
| *H04B 5/02* | (2006.01) |
| *H02J 7/02* | (2016.01) |
| *H02J 50/00* | (2016.01) |
| *H01F 27/36* | (2006.01) |

(52) U.S. Cl.
CPC .............. *H01Q 7/04* (2013.01); *H02J 50/12* (2016.02); *H02J 50/23* (2016.02); *H02J 50/402* (2020.01); *H02J 50/70* (2016.02); *H04B 5/0031* (2013.01); *H04B 5/0037* (2013.01); *H04B 5/0081* (2013.01); *H04B 5/0093* (2013.01); *H04B 5/02* (2013.01); *H01F 27/36* (2013.01); *H02J 7/025* (2013.01); *H02J 50/005* (2020.01)

(58) Field of Classification Search
CPC ........ H01F 27/365; H01F 27/38; H01F 38/14; H01F 27/2885; H01F 27/2804; H01F 27/36; H02J 7/025; H02J 50/23; H02J 50/40; H02J 50/20; H02J 50/12; H02J 50/005; H02J 50/70; H01Q 7/04
See application file for complete search history.

(56) References Cited

U.S. PATENT DOCUMENTS

| | | | |
|---|---|---|---|
| 3,484,731 A | 12/1969 | Rich | |
| 4,251,808 A | 2/1981 | Lichtblau | |
| 4,260,990 A | 4/1981 | Lichtblau | |
| 4,328,531 A | 5/1982 | Shinagawa | |
| 4,494,100 A | 1/1985 | Nejdl | |
| 4,959,631 A | 9/1990 | Hasegawa et al. | |
| 4,996,165 A | 2/1991 | Asbeck | |
| 5,137,478 A | 8/1992 | Graf | |
| 5,237,165 A | 8/1993 | Tingley, III | |
| 5,604,352 A | 2/1997 | Schuetz | |
| 5,713,939 A | 2/1998 | Nedungadi | |
| 5,748,464 A | 5/1998 | Schuetz | |
| 5,767,808 A | 6/1998 | Skogland | |
| 5,767,813 A | 6/1998 | Yao | |
| 5,777,538 A | 7/1998 | Schuetz | |
| 5,801,611 A | 9/1998 | Waanders | |
| 5,808,587 A | 9/1998 | Shima | |
| 5,838,154 A | 11/1998 | Nishibe | |
| 5,883,392 A | 3/1999 | Schuetz | |
| 5,892,489 A | 4/1999 | Mandai | |
| 5,980,773 A | 11/1999 | Takeda | |
| 6,005,193 A | 12/1999 | Markel | |
| 6,021,337 A | 2/2000 | Hodge | |
| 6,028,568 A | 2/2000 | Mandai | |
| 6,107,972 A | 8/2000 | Seward | |
| 6,148,221 A | 11/2000 | Hidaka | |
| 6,163,307 A | 12/2000 | Park | |
| 6,271,803 B1 | 8/2001 | Kanba | |
| 6,324,431 B1* | 11/2001 | Zarinetchi | A61N 1/3787 607/33 |
| 6,503,831 B2 | 1/2003 | Speakman | |
| 6,556,101 B1 | 4/2003 | Tada | |
| 6,583,769 B2 | 6/2003 | Asakura | |
| 6,664,863 B1 | 12/2003 | Ikeda | |
| 6,809,688 B2 | 10/2004 | Yamada | |
| 6,897,830 B2 | 5/2005 | Bae et al. | |
| 6,924,230 B2 | 8/2005 | Sheu | |
| 7,046,113 B1 | 5/2006 | Ikeda | |
| 7,205,655 B2 | 4/2007 | Sippola | |
| 7,355,558 B2 | 4/2008 | Lee | |
| 7,563,352 B2 | 7/2009 | Hubel | |
| 7,579,835 B2 | 8/2009 | Schnell | |
| 7,579,836 B2 | 8/2009 | Schnell | |
| 7,713,762 B2 | 5/2010 | Lee | |
| 7,786,836 B2 | 8/2010 | Gabara | |
| 7,952,365 B2 | 5/2011 | Kushta | |
| 7,962,186 B2 | 6/2011 | Cui et al. | |
| 8,056,819 B2 | 11/2011 | Rowell | |
| 8,299,877 B2 | 10/2012 | Hong | |
| 8,436,780 B2 | 5/2013 | Compston | |
| 8,567,048 B2 | 10/2013 | Babcock | |
| 8,610,530 B2 | 12/2013 | Singh | |
| 8,653,927 B2 | 2/2014 | Singh | |
| 8,680,960 B2 | 3/2014 | Singh | |
| 8,692,641 B2 | 4/2014 | Singh | |
| 8,692,642 B2 | 4/2014 | Singh | |
| 8,698,590 B2 | 4/2014 | Singh | |
| 8,698,591 B2 | 4/2014 | Singh | |
| 8,707,546 B2 | 4/2014 | Singh | |
| 8,710,948 B2 | 4/2014 | Singh | |
| 8,774,712 B2 | 7/2014 | Sato | |
| 8,803,649 B2 | 8/2014 | Singh | |
| 8,823,481 B2 | 9/2014 | Singh | |
| 8,823,482 B2 | 9/2014 | Singh | |
| 8,855,786 B2 | 10/2014 | Derbas | |
| 8,860,545 B2 | 10/2014 | Singh | |
| 8,898,885 B2 | 12/2014 | Babcock | |
| 9,178,369 B2 | 11/2015 | Partovi | |
| 9,208,942 B2 | 12/2015 | Frysz | |
| 9,559,526 B2 | 1/2017 | Von Novak, III et al. | |
| 9,912,173 B2 | 3/2018 | Tseng | |
| 2002/0020554 A1 | 2/2002 | Sakamoto | |
| 2002/0053992 A1 | 5/2002 | Kawakami | |
| 2002/0071003 A1 | 6/2002 | Kimura | |
| 2002/0075191 A1 | 6/2002 | Yokoshima | |
| 2002/0101383 A1 | 8/2002 | Junod | |
| 2002/0105080 A1 | 8/2002 | Speakman | |
| 2003/0006069 A1 | 1/2003 | Watanabe | |
| 2003/0058180 A1 | 3/2003 | Foster | |
| 2003/0119677 A1 | 6/2003 | Gao | |
| 2004/0000974 A1 | 1/2004 | Odenaal | |
| 2004/0085247 A1 | 5/2004 | Capelli | |
| 2004/0108311 A1 | 6/2004 | De Rooij | |
| 2004/0118920 A1 | 6/2004 | He | |
| 2004/0140528 A1 | 7/2004 | Kim | |
| 2004/0159460 A1 | 8/2004 | Passiopoulos | |
| 2004/0189528 A1 | 9/2004 | Delgado | |
| 2004/0217488 A1 | 11/2004 | Luechinger | |
| 2004/0227608 A1 | 11/2004 | Nakatani et al. | |
| 2005/0121229 A1 | 6/2005 | Sueyoshi | |
| 2005/0174628 A1 | 8/2005 | Zhang | |
| 2005/0195060 A1* | 9/2005 | Chiang | H01F 27/2804 336/200 |
| 2006/0022772 A1 | 2/2006 | Kanno | |
| 2006/0040628 A1 | 2/2006 | Porret | |
| 2006/0097833 A1* | 5/2006 | Lotfi | H01F 27/027 336/90 |
| 2006/0192645 A1 | 8/2006 | Lee | |
| 2006/0284718 A1 | 12/2006 | Benetik | |
| 2007/0018767 A1 | 1/2007 | Gabara | |
| 2007/0020969 A1 | 1/2007 | Yungers | |
| 2007/0023424 A1 | 2/2007 | Weber | |
| 2007/0045773 A1 | 3/2007 | Mizuno | |
| 2007/0046544 A1 | 3/2007 | Sano | |
| 2007/0095913 A1 | 5/2007 | Takahashi | |
| 2007/0120629 A1 | 5/2007 | Schnell | |
| 2007/0126543 A1 | 6/2007 | Yeh et al. | |
| 2007/0179570 A1 | 8/2007 | De Taboada | |
| 2007/0182367 A1 | 8/2007 | Partovi | |
| 2007/0247268 A1* | 10/2007 | Oya | H01F 17/0006 336/200 |
| 2007/0267718 A1 | 11/2007 | Lee | |
| 2007/0279287 A1 | 12/2007 | Castaneda | |
| 2008/0039332 A1 | 2/2008 | Touitou | |
| 2008/0055178 A1 | 3/2008 | Kim | |
| 2008/0062066 A1 | 3/2008 | Arai | |

(56) References Cited

U.S. PATENT DOCUMENTS

| | | |
|---|---|---|
| 2008/0067874 A1 | 3/2008 | Tseng |
| 2008/0150693 A1 | 6/2008 | You |
| 2008/0164840 A1 | 7/2008 | Kato et al. |
| 2008/0164844 A1 | 7/2008 | Kato et al. |
| 2008/0164960 A1 | 7/2008 | Schnell |
| 2008/0211320 A1 | 9/2008 | Secall |
| 2008/0277386 A1 | 11/2008 | Haimer |
| 2008/0283277 A1 | 11/2008 | Kusama |
| 2008/0303735 A1 | 12/2008 | Fukimoto |
| 2009/0015266 A1 | 1/2009 | Narita |
| 2009/0079628 A1 | 3/2009 | Rofougaran |
| 2009/0085706 A1 | 4/2009 | Duckworth |
| 2009/0096413 A1 | 4/2009 | Partovi et al. |
| 2009/0108974 A1 | 4/2009 | Raggam |
| 2009/0134875 A1 | 5/2009 | Tomiha |
| 2009/0140691 A1 | 6/2009 | Jung |
| 2009/0152542 A1 | 6/2009 | Leung |
| 2009/0230777 A1 | 9/2009 | Baarman et al. |
| 2009/0243397 A1* | 10/2009 | Cook .................. H02J 5/005 307/104 |
| 2009/0261778 A1 | 10/2009 | Kook |
| 2009/0261936 A1 | 10/2009 | Sarangan |
| 2010/0033290 A1 | 2/2010 | Frye |
| 2010/0072588 A1 | 3/2010 | Yang |
| 2010/0123582 A1 | 5/2010 | Smith et al. |
| 2010/0123584 A1 | 5/2010 | Lionetti et al. |
| 2010/0127660 A1 | 5/2010 | Widmer |
| 2010/0141042 A1 | 6/2010 | Giler |
| 2010/0164296 A1 | 7/2010 | Soljacic |
| 2010/0219694 A1 | 9/2010 | Kurs et al. |
| 2010/0225270 A1 | 9/2010 | Jacobs et al. |
| 2010/0259217 A1 | 10/2010 | Baarman et al. |
| 2010/0289599 A1 | 11/2010 | Vangala |
| 2010/0289709 A1 | 11/2010 | Guan |
| 2010/0295652 A1 | 11/2010 | Mori |
| 2010/0295701 A1 | 11/2010 | Cazenave |
| 2011/0018360 A1* | 1/2011 | Baarman ............... H02J 7/0027 307/104 |
| 2011/0024510 A1 | 2/2011 | Ishino |
| 2011/0084656 A1 | 4/2011 | Gao |
| 2011/0101788 A1 | 5/2011 | Sun et al. |
| 2011/0137379 A1 | 6/2011 | Wosmek |
| 2011/0241437 A1 | 10/2011 | Kanno |
| 2011/0248891 A1 | 10/2011 | Park |
| 2011/0279198 A1 | 11/2011 | Haner |
| 2012/0044034 A1* | 2/2012 | Nazarian ............. H01F 17/0013 336/200 |
| 2012/0062345 A1 | 3/2012 | Kurs |
| 2012/0095531 A1 | 4/2012 | Derbas |
| 2012/0169434 A1 | 7/2012 | Mori |
| 2012/0217819 A1 | 8/2012 | Yamakawa et al. |
| 2012/0235500 A1 | 9/2012 | Schatz |
| 2012/0235634 A1 | 9/2012 | Kulikowski |
| 2012/0235636 A1 | 9/2012 | Partovi |
| 2012/0249396 A1 | 10/2012 | Parsche |
| 2012/0274148 A1 | 11/2012 | Sung et al. |
| 2012/0280765 A1 | 11/2012 | Kurs et al. |
| 2012/0306262 A1* | 12/2012 | Taguchi .................. H02J 7/025 307/9.1 |
| 2012/0326931 A1 | 12/2012 | Kato |
| 2013/0038281 A1 | 2/2013 | Sakakibara et al. |
| 2013/0067737 A1 | 3/2013 | Singh |
| 2013/0067738 A1 | 3/2013 | Singh |
| 2013/0068499 A1 | 3/2013 | Singh |
| 2013/0068507 A1 | 3/2013 | Singh |
| 2013/0069748 A1 | 3/2013 | Frysz |
| 2013/0069749 A1 | 3/2013 | Singh |
| 2013/0069750 A1 | 3/2013 | Singh |
| 2013/0069843 A1 | 3/2013 | Frysz |
| 2013/0076154 A1 | 3/2013 | Baarman |
| 2013/0127411 A1 | 5/2013 | Ichikawa et al. |
| 2013/0146671 A1 | 6/2013 | Woerle |
| 2013/0199027 A1 | 8/2013 | Singh |
| 2013/0199028 A1 | 8/2013 | Singh |
| 2013/0200070 A1 | 8/2013 | Singh |
| 2013/0200722 A1 | 8/2013 | Singh |
| 2013/0200968 A1 | 8/2013 | Singh |
| 2013/0200969 A1 | 8/2013 | Singh |
| 2013/0200976 A1 | 8/2013 | Singh |
| 2013/0201589 A1 | 8/2013 | Singh |
| 2013/0205582 A1 | 8/2013 | Singh |
| 2013/0207744 A1 | 8/2013 | Singh |
| 2013/0208389 A1 | 8/2013 | Singh |
| 2013/0208390 A1 | 8/2013 | Singh |
| 2013/0234899 A1 | 9/2013 | Pope et al. |
| 2013/0257362 A1 | 10/2013 | Lim |
| 2013/0257367 A1 | 10/2013 | Someya |
| 2013/0300207 A1 | 11/2013 | Wang |
| 2013/0307347 A1 | 11/2013 | Davila et al. |
| 2014/0008974 A1 | 1/2014 | Miyamoto |
| 2014/0028111 A1 | 1/2014 | Hansen |
| 2014/0035383 A1 | 2/2014 | Riehl |
| 2014/0035793 A1 | 2/2014 | Ozawa |
| 2014/0041218 A1 | 2/2014 | Signh |
| 2014/0047713 A1 | 2/2014 | Derbas |
| 2014/0084946 A1 | 3/2014 | Gadot |
| 2014/0091640 A1 | 4/2014 | Scholz et al. |
| 2014/0091756 A1 | 4/2014 | Ofstein et al. |
| 2014/0168019 A1 | 6/2014 | Uejima |
| 2014/0183966 A1 | 7/2014 | Suzuki et al. |
| 2014/0183971 A1 | 7/2014 | Endo |
| 2014/0197694 A1 | 7/2014 | Asanuma et al. |
| 2014/0197832 A1 | 7/2014 | Driesel et al. |
| 2014/0231518 A1 | 8/2014 | Yosui |
| 2014/0266019 A1 | 9/2014 | Pigott |
| 2014/0327394 A1 | 11/2014 | Asselin et al. |
| 2014/0361628 A1 | 12/2014 | Keeling |
| 2015/0054455 A1 | 2/2015 | Kim |
| 2015/0091502 A1 | 4/2015 | Mukherjee et al. |
| 2015/0115727 A1 | 4/2015 | Carobolante et al. |
| 2015/0116090 A1* | 4/2015 | Proehl .................. H04B 5/0037 340/10.1 |
| 2015/0136858 A1 | 5/2015 | Finn |
| 2015/0137746 A1 | 5/2015 | Lee et al. |
| 2015/0140807 A1 | 5/2015 | Mohammed |
| 2015/0145634 A1 | 5/2015 | Kurz |
| 2015/0145635 A1 | 5/2015 | Duetsch |
| 2015/0170830 A1* | 6/2015 | Miyamoto ............... H02J 5/005 307/104 |
| 2015/0180440 A1 | 6/2015 | Ishizuka |
| 2015/0201385 A1 | 7/2015 | Mercer et al. |
| 2015/0207541 A1 | 7/2015 | Kuroda |
| 2015/0236545 A1 | 8/2015 | Song |
| 2015/0280322 A1 | 10/2015 | Saito |
| 2015/0302971 A1* | 10/2015 | Wagman ............ H01F 27/2804 336/200 |
| 2015/0303708 A1 | 10/2015 | Efe et al. |
| 2015/0318710 A1 | 11/2015 | Lee et al. |
| 2015/0357827 A1 | 12/2015 | Muratov et al. |
| 2015/0364929 A1 | 12/2015 | Davis |
| 2015/0379838 A1* | 12/2015 | Xie ........................ H02J 50/12 340/572.3 |
| 2016/0006845 A1 | 1/2016 | McKittrick |
| 2016/0029266 A1 | 1/2016 | Choi-Grogan |
| 2016/0056664 A1 | 2/2016 | Partovi |
| 2016/0087477 A1 | 3/2016 | Jeong et al. |
| 2016/0118711 A1 | 4/2016 | Ummenhofer |
| 2016/0126002 A1 | 5/2016 | Chen |
| 2016/0149416 A1 | 5/2016 | Ha et al. |
| 2016/0156103 A1 | 6/2016 | Bae et al. |
| 2016/0156215 A1 | 6/2016 | Bae |
| 2016/0211702 A1* | 7/2016 | Muratov ................. H01F 27/38 |
| 2016/0224975 A1 | 8/2016 | Na |
| 2016/0226292 A1 | 8/2016 | Yoon |
| 2016/0292669 A1 | 10/2016 | Tunnell |
| 2016/0322852 A1 | 11/2016 | Yeh et al. |
| 2016/0372960 A1 | 12/2016 | Ritter et al. |
| 2017/0104358 A1* | 4/2017 | Song ...................... H01F 27/22 |
| 2017/0117085 A1 | 4/2017 | Mao et al. |
| 2017/0126544 A1 | 5/2017 | Vigneras |
| 2017/0207535 A1* | 7/2017 | Tsukuda .................. H01Q 7/00 |
| 2017/0264343 A1 | 9/2017 | Mao et al. |
| 2017/0331173 A1 | 11/2017 | Ju et al. |
| 2018/0019624 A1 | 1/2018 | Chen |

(56) References Cited

U.S. PATENT DOCUMENTS

| | | | |
|---|---|---|---|
| 2018/0159368 A1 | 6/2018 | Arnold et al. | |
| 2018/0166921 A1 | 6/2018 | Peralta | |
| 2018/0167107 A1 | 6/2018 | Peralta | |
| 2018/0167108 A1 | 6/2018 | Peralta | |
| 2018/0167109 A1 | 6/2018 | Peralta | |
| 2018/0167110 A1 | 6/2018 | Peralta | |
| 2018/0168057 A1 | 6/2018 | Peralta | |
| 2018/0198322 A1 | 7/2018 | Mercier et al. | |
| 2018/0212649 A1 | 7/2018 | Tenno | |
| 2018/0219425 A1 | 8/2018 | Choi et al. | |
| 2018/0262050 A1 | 9/2018 | Yankowitz | |
| 2018/0269714 A1 | 9/2018 | Samuelsson et al. | |
| 2018/0287435 A1 | 10/2018 | Wilson et al. | |
| 2018/0342348 A1* | 11/2018 | Esguerra | H01F 1/37 |
| 2019/0075657 A1* | 3/2019 | Esposito | H01F 27/2804 |
| 2020/0411990 A1 | 12/2020 | Nakamura et al. | |

FOREIGN PATENT DOCUMENTS

| | | |
|---|---|---|
| CN | 104037493 A | 9/2014 |
| CN | 104037494 A | 9/2014 |
| EP | 0310396 A | 4/1989 |
| EP | 2775565 A1 | 9/2004 |
| EP | 1609503 A1 | 12/2005 |
| EP | 2031729 A2 | 3/2009 |
| JP | 1-310518 | 12/1989 |
| JP | 5-83249 | 4/1993 |
| JP | 2008-307114 | 11/1996 |
| JP | 09-093005 | 4/1997 |
| JP | 10-255629 | 9/1998 |
| JP | 2001344574 | 12/2001 |
| JP | 2007-7042569 | 2/2007 |
| JP | 2008-160781 | 7/2008 |
| JP | 2008-205215 | 9/2008 |
| JP | 2008-294285 | 12/2008 |
| JP | 2012-147408 | 8/2012 |
| JP | 2013-93429 | 5/2013 |
| JP | 2014-175864 A | 9/2014 |
| JP | 2014-175865 A | 9/2014 |
| KR | 10-20100092741 | 8/2010 |
| KR | 10-2013-0015618 | 2/2013 |
| KR | 10-2014-0111554 A | 9/2014 |
| KR | 10-2014-0111794 A | 9/2014 |
| KR | 2014-0135357 | 11/2014 |
| KR | 10-1559939 B1 | 10/2015 |
| TW | 201436494 A | 9/2014 |
| TW | 201436495 A | 9/2014 |
| WO | 2008/050917 | 5/2008 |
| WO | 2010/104569 | 9/2010 |
| WO | 2015137431 A1 | 9/2015 |

OTHER PUBLICATIONS

Ex. 1014 U.S. Pat. No. 6,083,842 to Cheung et al., 8 pages.
Ex. 1015 Reinhold—Efficient Antenna Design of Inductive Coupled RFID—Systems with High Power Demand, Journal of Communication vol. 2, No. 6, Nov. 2007, 10 pages.
Ex. 1016 U.S. Pat. No. 4,549,042 to Akiba et al., 8 pages.
Ex. 1017—U.S. Pat. No. 5,812,344 to Balakrishnan, 12 pages.
Ex. 1018—Wheeler, Formulas for the Skin (1942), 13 pages.
Ex. 1019—Kyriazidou—7236080, 12 pages.
Ex. 1020 Alldred et al., "A 1.2 V, 60 Ghz radio receiver with onchip transformers and inductors in 90 nm CMOS," Proc. IEEE Compound Semiconductor Integrated Circuits SYmp., pp. 51-54, Nov. 2006 ("Alldred"), 12 pages.
Ex. 1022 U.S. Pat. No. 9,912,173 to Tseng, 31 pages.
Ex. 1023 U.S. Pat. No. 7,248,138 to Chiang, 18 pages.
Ex. 1024 U.S. Pat. No. 5,084,958 to Yerman et al., 20 pages.
Ex. 1025—US20070126544—Wotherspoon, 6 pages.
Ex. 1028—U.S. Pat. No. 9,820,374 to Bois et al., 9 pages.
Ex. 1029 U.S. Pat. No. 7,601,919 to Phan et al., 14 pages.
Ex. 1030 U.S. Pat. No. 5,108,825 to Wojnarowski et al., 10 pages.
Ex. 1031 Ahn 7305725, 9 pages.
Ex. 1032—U.S. Pat. No. 5,745,331 to Shamouilian et al., 23 pages.
Ex. 1033—Hu, et al., "AC Resistance to Planar Power Inductors and the Quasidistributed Gap Technique," IEEE Transactions on Power Electronics, vol. 16, No. 4, Jul. 2001 ("Hu"), 13 pages.
Ex. 1034—U.S. Pat. No. 6,608,363 to Fazelpour, 8 pages.
Ex. 1035—IEEE Xplore web page, 2 pages.
Ex. 1036 Kraemer et al., "Architecture Considerations for 60 GhzPulse Transceiver Front-Ends," CAS 2007 Proceedings vol. 2, 2007, Int'l Semiconductor Conference (2007), 26 pages.
Ex. 1037—Varonen et al., "V-band Balanced Resistive Mixer in 65-nm CMOS," Proceedings of the 33rd European Solid-State Circuits Conference (2007), 22 pages.
Ex. 1038—IEEE Xplore web page, 2 pages.
Ex. 1039—Lopera et al., "A Multiwinding Modeling Method for High Frequency Transformers and Inductors", IEEE Transactions on Power Electronics, vol. 18, No. 3, May 2003, 14 pages.
Ex. 1040—Leonavicius et al., "Comparison of Realization Techniques for PFC Inductor Operating in Discontinuous Conduction Mode," IEEE Transactions on Power Electronics, vol. 19, No. 2, Mar. 2004, 14 pages.
Ex. 1041—Roshen, W.A., "Fringing Field Formulas and Winding Loss Due to an Air Gap," IEEE Transactions on Magnetics, vol. 43, No. 8, Aug. 2007, 12 pages.
IPR2019-00859—Petition for Inter Partes Review of U.S. Pat. No. 9,300,046, 87 pages.
Ex. 1001 U.S. Pat. No. 9,300,046 to Singh et al., 50 pages.
Ex. 1004—Prosecution History of U.S. Pat. No. 9,300,046, 322 pages (in two attachments A and B) due to size.
IPR2019-00860—Petition for Inter Partes Review of U.S. Pat. No. 8,680,960, 86 pages.
IPR2019-00861—Petition for Inter Partes Review of U.S. Pat. No. 9,300,046, 89 pages.
IPR2019-00862—Petition for Inter Partes Review of U.S. Pat. No. 8,710,948, 88 pages.
Ex. 1001 U.S. Pat. No. 8,710,948 to Singh et al., 50 pages.
Ex. 1004 File History of U.S. Pat. No. 8,710,948 to Singh et al., 213 pages . . . .
IPR2019-0863 Petition for Inter Partes Review of U.S. Pat. No. 8,698,591, 89 pages.
Ex. 1001 U.S. Pat. No. 8,698,591, 49 pages.
Ex. 1004—Prosecution History of U.S. Pat. No. 8,698,591, 180 pages.
EP Communication pursuant to Rule 62 EPC regarding extended European Search Report for EP App. No. 16835665.7-1212 dated May 15, 2019, 16 pages.
Notification of Decision of Rejection for KR App. No. 10-2013-0025858 dated May 14, 2019, English Translation, 8 pages.
Notification of Decision of Rejection for KR 10-2013-0026135 dated May 14, 2019, 8 pages with translation.
EP Communication of extended European Search Report for EP 19154162.2 dated Jun. 12, 2019, 9 pages.
EP Search Report 10751119.8.
EP Search Report 13001121 6.
EP Search Report 13001130.7.
EP Search Report 14000885.5.
Relative Permativity—Dielectric Constant—Jul. 2011 (3 pages).
Office Action dated Sep. 27, 2016 in corresponding EP Application No. 13 001 130.7 (6 pages).
Office Action dated Sep. 27, 2016 in corresponding EP Application No. 13 001 121.6(6 pages).
Office Action dated Jan. 31, 2017 in corresponding JP Application No. 2013-047049 (5 pages).
Office Action dated Jun. 29, 2017 in corresponding EP Application No. 14000885.5 (4 pages).
Office Action dated Feb. 21, 2017 in corresponding TW Application No. 102108342 (10 pages).
Office Action dated Mar. 21, 2017 in corresponding JP Application No. 2013-047048 (12 pages).
International Search Report and Written Opinion dated Oct. 14, 2016 for PCT/US2016/045588 (10 pages).
International Search Report and Written Opinion dated Oct. 28, 2016 for PCT/US2016/047607 (9 pages).

(56) References Cited

OTHER PUBLICATIONS

International Search Report and Written Opinion dated issued in PCT/US2017/048708 dated Nov. 8, 2017 (10 pages).
Written Opinion and International Search Report issued in corresponding International Application No. PCT/US2017.065329 dated Feb. 21, 2018 (7 pages).
Office Action issued in corresponding Japanese Patent Application No. 2013-047048 dated Dec. 12, 2017 (11 pages).
Office Action issued in corresponding Chinese Patent Application No. 201310074946.8 dated Mar. 30, 2018 (12 pages).
Office Action issued in corresponding Chinese Patent Application No. 201310075086.X dated Mar. 27, 2018 (11 pages).
Office Action issued in corresponding Japanese Patent Application No. 2013-047048 dated May 8, 2018 (2 pages).
Decision of Dismissal of Amendment issued in corresponding Japanese Patent Application No. 2013-047048 dated May 8, 2018 (7 pages).
Office Action issued in corresponding Taiwanese Patent Application No. 102108345 dated Apr. 27, 2018 (11 pages).
Office Action issued in corresponding Japanese Patent Application No. 2013-047049 dated Nov. 28, 2017 (5 pages).
Office Action issued in corresponding Chinese Patent Application No. 201310075086.X dated Aug. 25, 2017 (13 pages).
Office Action issued in corresponding Chinese Patent Application No. 201310074946.8 dated Aug. 23, 2017 (13 pages).
Office Action issued in corresponding Chinese Patent Application No. 201310074946.8 dated Sep. 12, 2018 (9 pages).
Office Action issued in corresponding Chinese Patent Application No. 201310075086.X dated Sep. 12, 2018 (10 pages).
Notification of Reasons for Refusal issued in corresponding Korean Application No. 10-2013-0026135, dated Oct. 29, 2018, 12 pages.
Notification of Reasons for Refusal issued in corresponding Korean Application No. 10-2013-0025858, dated Oct. 29, 2018, 12 pages.
EP Office Communication Pursuant to Article 94(3) dated Jan. 17, 2019 for EP App. No. 13001121.6-1216.
EP Communication pursuant to Rule 164(1) EPC regarding partial supplementary European Search Report for EP App. No. 16835665.7-1212 dated Feb. 14, 2019, 20 pages.

Muratov, V., Multi-Mode Wireless Power Systems can be a bridge to the Promised Land of Universal Contactless charging, Mediatek, Inc., Nov. 20, 2014, 15 pages.
Qi 2010, "System Description Wireless Power Transfer", vol. 1, Low Power, Part 1: Interface Definition, Version 1.0.1, Oct. 2010, Wireless Power Consortium, 86 pages.
Narayanan, R., "Wireless Power Charging Coil Changing Considerations", Wurth Elektronik, Feb. 23, 2015, 9 pages.
Barcelo, T., "Wireless Power User Guide", Linear Technology, Application Note 138, Oct. 2013, 8 pages.
Yoon, Y., "Embedded conductor technology for micromachined RF elements", Journal of Micromechanics and Microengineering, Jun. 2005, 11 pages.
Burghartz, J., "On the Design of RF Spiral Inductors on Silicon", IEEE Transactions on Electron Devices, vol. 50, No. 3, Mar. 2003, pp. 718-729.
Qi 2009, "System Description Wireless Power Transfer", vol. 1, Low Power, Version 0.95, Jul. 2009, 76 pages.
Lee, Y., "Antenna Circuit Design for RFID Applications", 2003 Microchip Technology, AN710, 50 pages.
Sun, M., et al., "Apparatus for Wireless Power and Data Transfer Over a Distance", University of Pittsburgh, Jun. 2009, 30 pages.
IPR2019-00858—Petition for Inter Partes Review of U.S. Pat. No. 8,680,960, *Samsung Electronics Co., Ltd.* v. *NuCurrent, Inc.*, 90 pages.
IPR2019-00858—Ex. 1001 U.S. Pat. No. 8,680,960.
IPR2019-00858—Ex 1004—File History for U.S. Pat. No. 8,680,960.
Ex. 1002 Declaration of Dr. Steven Leeb, 115 pages.
Ex. 1003—CV of Dr. Steven B. Leeb, 7 pages.
Ex. 1005—US20070267718A1 to Lee, 13 pages.
Ex. 1006—Semat—Physics Chapters 29-32, 81 pages, (1958).
Ex 1009—US20090096413 to Partovi, 88 pages.
Ex 1010—IEEE Dictionary 1996 (excerpt), 9 pages.
Ex. 1011—US20070089773A1 to Koester et al., 26 pages.
Ex. 1012—US20120280765 to Kurs, 122 pages.
First Office Action for Chinese App. No. 201680058731.9 dated Aug. 5, 2019, English Translation, 6 pages.
Extended Search Report for EP 19188841.1-1216 dated Sep. 10, 2019, 11 pages.
Wikipedia, "Ferrite (magnet)," May 16, 2017, retrieved via Wayback machine at https://web.archive.org/web/20170516230201/https://en.wikipedia.org/wiki/Ferrite_(magnet) (Year: 2017), 5 pages.

\* cited by examiner

FIG. 28D-E

CROSSOVER COIL STRUCTURE FOR WIRELESS TRANSMISSION

RELATED APPLICATION

This application claims priority to U.S. Provisional Application No. 62/511,688, filed on May 26, 2017, the disclosure of which is entirely incorporated herein by reference.

TECHNICAL FIELD

The present disclosure generally relates to the wireless transmission of electrical energy and data. More specifically, this application relates to various embodiments which enable the transmission of wireless electrical energy by near-field magnetic coupling.

BACKGROUND

Near field magnetic coupling (NFMC) is a commonly employed technique to wirelessly transfer electrical energy. The electrical energy may be used to directly power a device, charge a battery or both.

In NFMC an oscillating magnetic field generated by a transmitting antenna passes through a receiving antenna that is spaced from the transmitting antenna, thereby creating an alternating electrical current that is received by the receiving antenna.

However, the oscillating magnetic field radiates in multiple directions from the transmitting antenna. Thus, transmission of electrical energy between opposed transmitting and receiving antennas may be inefficient as some of the transmitted magnetic fields may radiate in a direction away from the receiving antenna.

In contrast to the prior art, the subject technology provides a wireless electrical power transmitting and receiving antenna and system thereof that increases transmission of electrical energy therebetween, particularly in the presence of a metallic environment. Furthermore, in contrast to the prior art, the wireless electrical power transmitting system enables multiple electronic devices to be electrically charged or powered by positioning one or more devices in non-limiting orientations with respect to the transmitting antenna. Therefore, multiple devices may be electrically charged or powered simultaneously, regardless of their physical orientation with the transmitting antenna.

SUMMARY

The present disclosure relates to the transfer of wireless electrical energy and/or data between a transmitting antenna and a receiving antenna. In one or more embodiments, at least one of a transmitting antenna and a receiving antenna comprising an inductor coil having a figure eight configuration is disclosed. In one or more embodiments, a "figure eight" coil configuration comprises at least one filar, forming the coil, crosses over itself thereby forming a "figure-eight" coil configuration. Such an inductor coil configuration improves the efficiency of wireless electrical energy transmission by focusing the radiating magnetic field in a uniform direction, towards the receiving antenna. In one or more embodiments the figure eight coil configuration minimizes coupling of magnetic fields with the surrounding environment thereby improving the magnitude and efficiency of wireless electrical energy transmission.

In one or more embodiments, a wireless electrical power system comprising at least one transmitting and receiving antenna is disclosed. In one or more embodiments the at least one transmitting and receiving antenna of the electrical system comprises at least one inductor coil with a figure eight configuration. In one or more embodiments, at least one of the transmitting and receiving antennas of the wireless electrical power system may be configured within an electronic device. Such electronic devices may include, but are not limited to, consumer electronics, medical devices, and devices used in industrial and military applications.

In one or more embodiments at least one of the wireless electrical power transmitting and receiving antennas is configured with one or more magnetic field shielding embodiments that increase the quantity of the magnetic field within a given volume of space, i.e., density of the magnetic field that emanates from the antenna. In one or more embodiments the wireless electrical power transmitting antenna is configured with one or more magnetic field shielding embodiments that control the direction in which the magnetic field emanates from the antenna. Furthermore, the transmitting and/or the receiving antenna is configured with one or more embodiments that increase the efficiency, reduces form factor and minimizes cost in which electrical energy and/or data is wirelessly transmitted. As a result, the subject technology provides a wireless electrical energy transmission transmitting and/or receiving antenna and system thereof that enables increased efficiency of wireless electrical energy transmission.

BRIEF DESCRIPTION OF THE DRAWINGS

FIGS. 28A-28G illustrates an embodiment of a process of assembling a transmitting or receiving antenna of the present application.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various embodiments illustrated in the present disclosure provide for the wireless transfer of electrical energy and/or data. More specifically, the various embodiments of the present disclosure provide for the wireless transmission of electrical energy and/or data via near field magnetic coupling between a transmitting antenna and a receiving antenna.

Figure 1:
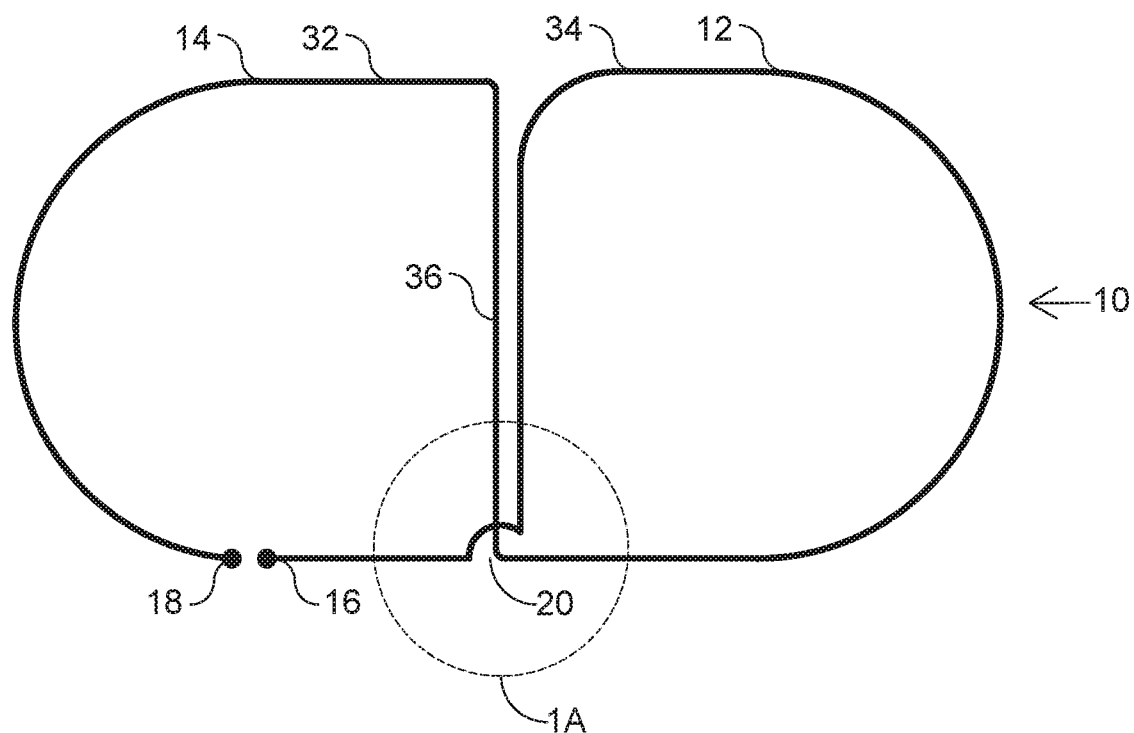
FIG. 1 illustrates an embodiment of an inductor coil with a figure eight configuration of the present application.

Now turning to the figures, FIG. 1 illustrates an example of a configuration of an antenna 10 of the present application. The antenna 10 may be configured to either receive or transmit electrical energy and/or data via NFMC. In at least one or more embodiments, the antenna 10 comprises at least one inductor coil 12 having at least one turn formed by at least one filar or wire 14. In at least one or more embodiments, the inductor coil 12 is arranged in a configuration that resembles a "figure-eight". In one or more embodiments, the at least one filar 14 forming the inductor coil 12 crosses over itself forming a "figure-eight" coil configuration. As illustrated in FIG. 1, the inductor coil 12 comprises at least one filar 14 that continuously extends from a first coil end 16 to a second coil end 18. In one or more embodiments, the point at which the filar 14 crosses over itself between the first and second ends 16, 18 is referred to as a crossover intersection 20. In one or more embodiments, the filar 14 may have a constant or a variable filar width.

As will be discussed in more detail, when configured within a transmitting antenna 22 (FIG. 4), the figure-eight coil configuration of the present application helps to focus magnetic fields 24 (FIG. 4) to emanate toward a receiving antenna 26 from the inductor coil 12 of the transmitting antenna 22, thereby minimizing interference with a metallic object or objects that may be positioned about the periphery of the transmitting antenna 22. Furthermore, as a result of the figure-eight coil configuration, coupling decreases between the transmitting antenna and external metallic objects, and in some cases increases between the transmitting antenna 22 and a receiving antenna 26 (FIG. 4) which results in increased efficiency of the wireless transmission of electrical energy and/or data therebetween.

Figure 1A:
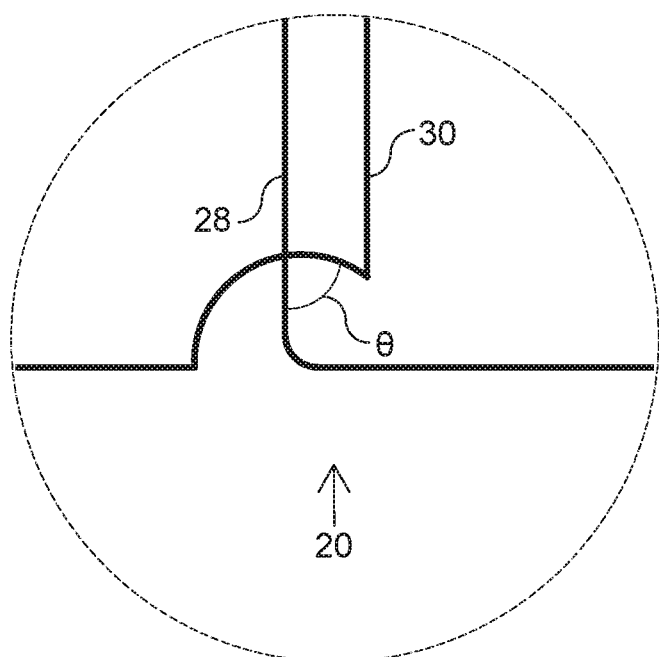
FIG. 1A is a magnified view of the figure eight configuration illustrated in FIG. 1.

As illustrated in FIGS. 1, 1A, 5, 5A, and 6, in one or more embodiments, the crossover intersection 20 comprises a first filar portion 28 and a second filar portion 30. As illustrated in FIGS. 1, 1A, 5, 5A, and 6, the first filar portion 28 crosses over the second filar portion 30 at the crossover intersection 20. Likewise, the second filar portion 30 may crossover the first crossover filar portion 28. Thus, as a result of the figure eight construction, the inductor coil 12 comprises a first inductor coil loop 32 comprising the first filar portion 28 and a second inductor coil loop 34 comprising the second filar portion 30. FIG. 1A illustrates a magnified view of an embodiment of the crossover intersection 20 illustrated in FIG. 1.

In one or more embodiments, the inductor coil 12 comprising the figure eight construction may have an overlap area 36. As defined herein the overlap area 36 is the area encompassed by the first filar portion 28 and the second filar portion 30 (shown in FIG. 1A) that resides within either of the first or second inductor coil loops 32, 34. FIG. 1 illustrates an embodiment of the overlap area 36 encompassed by the first and second filar portions 28, 30 that resides within the first inductor coil loop 32. In one or more embodiments, magnetic fields 24 within the overlap area 36 cancel each other. In one or more embodiments, the overlap area 36 may be configured to adjust the inductance exhibited by the inductor coil 12. In general, increasing the size of the overlap area 36 decreases inductance and coupling exhibited by the inductor coil 12 whereas decreasing the size of the overlap area 36 increases the inductance and coupling exhibited by the inductor coil 12.

Figure 2:
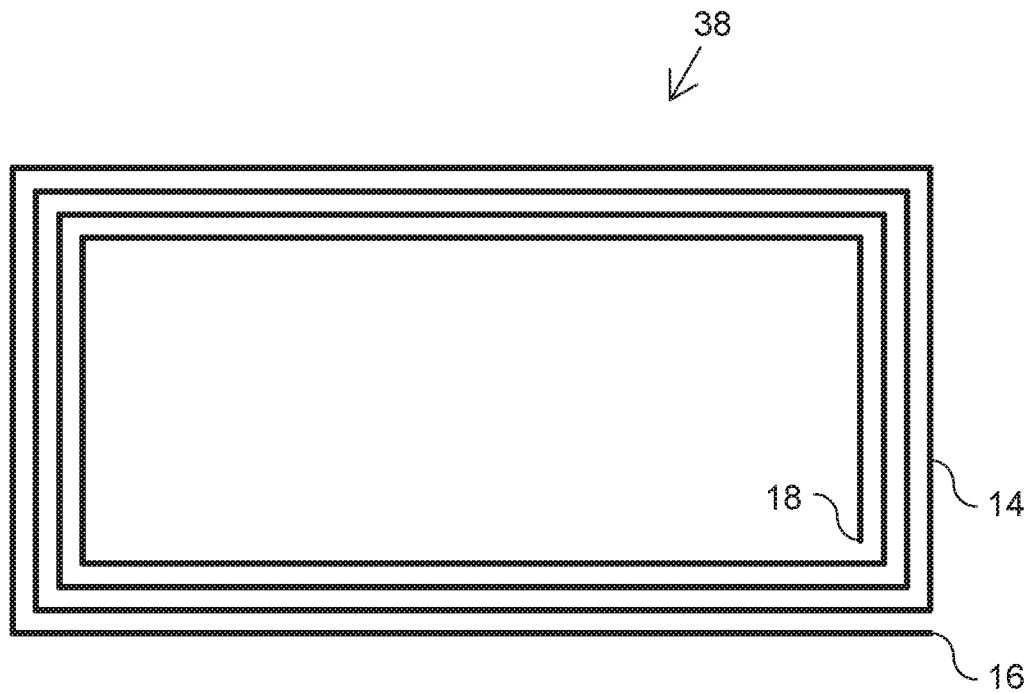
FIG. 2 shows an embodiment of an inductor coil that does not have a figure eight configuration.

In contrast to the figure eight coil configuration of the present application, FIG. 2 illustrates an example of an inductor coil 38 that does not comprise the figure eight configuration of the present application. As shown the inductor coil 38 of FIG. 2 is of a spiral configuration in which the first coil end 16 resides at the end of the outer most coil turn and the second coil end 18 resides at the end of the inner most coil turn.

Figure 3:
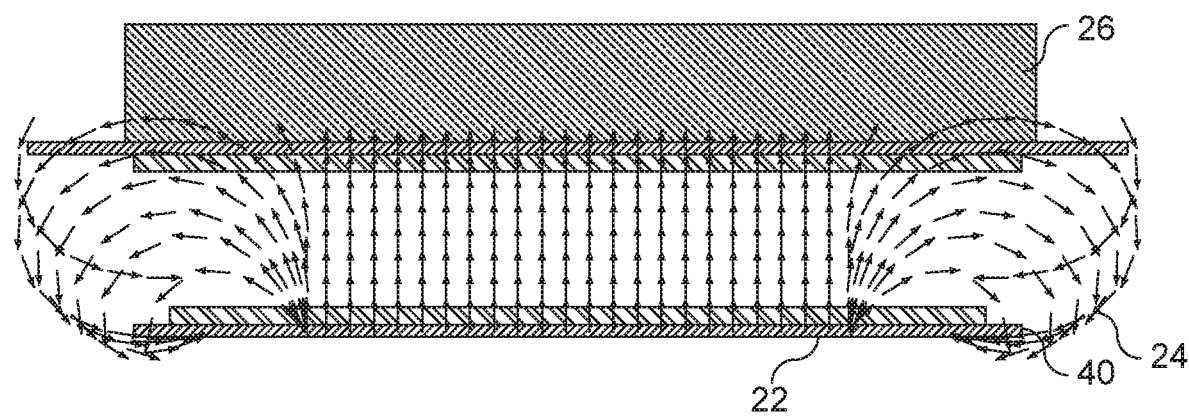
FIG. 3 is a cross-sectional view showing an embodiment of the transmission of a magnetic field between a transmitting antenna having an inductor coil that is not of a figure eight configuration and a receiving antenna.

FIG. 3 illustrates a cross-sectional view of an embodiment of wireless transmission of electrical energy between a transmitting antenna 22 and a receiving antenna 26 in which both the transmitting and receiving antennas 22, 26 comprise a transmitting and receiving coil, respectively, lacking the figure-eight configuration. More specifically, in the embodiment shown in FIG. 3, the transmitting antenna 22 comprises an inductor coil 38 that lacks the figure-eight coil configuration. In one or more embodiments, as illustrated in FIG. 3, emanating magnetic fields 24 follow a circular path around the current carrying filar 14 of the inductor coil 38. Further referencing the cross-sectional view of FIG. 3, electrical current within the inductor coil 38 at the opposing left and right coil ends shown in the cross-sectional view flows in opposite directions to each other, i.e., electrical current at the left end flows in a left direction and the electrical current at the right end, flows in a right direction. Furthermore, as the current electrical current changes direction, i.e. from flowing in a left direction back towards the right and vice versa within the inductor coil 38, this causes at least a portion of the emanating magnetic field 24 to follow a path away from the inductor coil 12 of the transmitting antenna 22 and curve around an edge 40 of the transmitting antenna 22. As a result, efficiency of the wireless transmission of the electrical energy between the transmitting antenna 22, having the inductor coil 38 not configured with a figure eight configuration, and the receiving antenna 26 decreases as some of the emanating magnetic fields 24 do not contribute to the flux of the receiving antenna 26. Furthermore, a metallic object (not shown) positioned adjacent to the transmitting antenna 22 may adversely interact with emanating magnetic fields 24 not emanating directly towards the receiving antenna 26 such as the magnetic fields 24 as illustrated travelling in a curved direction around the edge 40 of the transmitting antenna 22 in FIG. 3. As a result of this interaction between a portion of the emanating magnetic fields 24 and a metallic object (not shown), the magnitude of transmitted electrical power between the transmitting and receiving antennas 22, 26 is reduced.

In contrast to the inductor coil 38 illustrated in FIG. 2, the inductor coil 12 of the present application comprises a figure eight construction that focuses the direction of the emanating magnetic fields 24 in a uniform direction. Thus, spurious magnetic field emanating directions such as magnetic fields emanating in a curved or circular direction around an edge 40 of the transmitting antenna 22, as illustrated in FIG. 3, is minimized.

Figure 4:
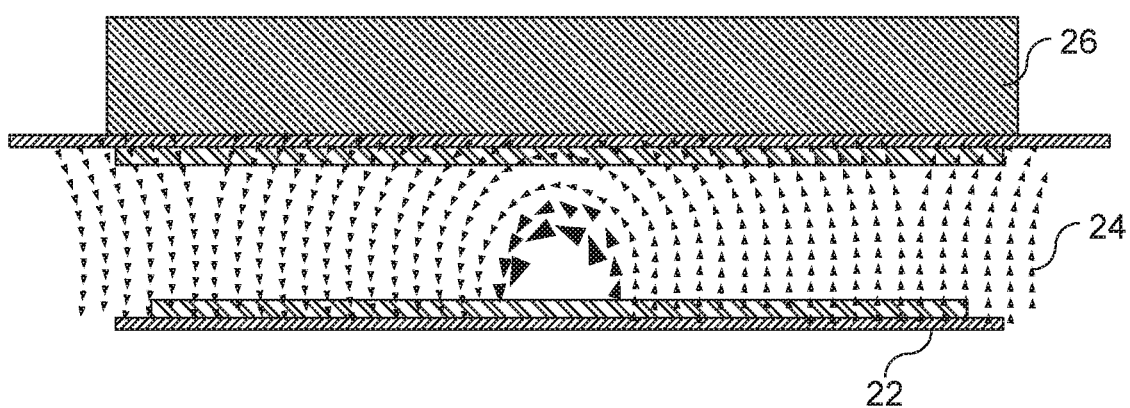
FIG. 4 is a cross-sectional view showing an embodiment of the transmission of a magnetic field between a transmitting antenna having an inductor coil with a figure eight configuration and a receiving antenna having an inductor coil with a figure eight configuration.

In one or more embodiments, magnetic fields 24 emanating from the inductor coil 12 of the subject technology having a figure eight configuration exhibit the pattern shown in FIG. 4. As illustrated in the embodiment shown in FIG. 4, magnetic fields 24 emanating from a transmitting antenna 22 comprising an inductor coil 12 having a figure eight configuration emanate in a direct, straight direction between opposing transmitting and receiving antennas 22, 26. As shown, in the embodiment of FIG. 4 a significantly reduced quantity of emanating magnetic fields 24, unlike the quantity of emanating magnetic fields 24 shown in FIG. 3, curve around the respective edges 40 of the transmitting antenna 22. This, therefore, increases efficiency and the magnitude of wireless electrical energy and/or data as an increased amount of magnetic field 24 is directed from the transmitting antenna 22 towards the receiving antenna 26. In addition, potential interference with a metallic object or objects (not shown) positioned adjacent to the transmitting antenna 22 is minimized. As a result, coupling between the transmitting antenna 22 and the receiving antenna 26 increases relative to each other.

In one or more embodiments, the figure eight coil configuration of the present application creates an additional current carrying path at the crossover intersection 20 that bisects the electrical current flowing through either of the first or second filar portions 28, 30. As a result, there are three electrical currents at the crossover intersection 20 instead of two electrical currents if not constructed with the figure eight configuration. In one or more embodiments, the filar 14 comprising the figure eight configuration crosses the intersection 20 twice in the same direction as compared to the electrical current flowing within the inductor coil 12 at the respective first and second inductor coil ends 16, 18 which flows in the same direction with respect to each other. Therefore, the electrical current at the crossover intersection 20 has a magnitude that is twice as great as the electrical current at the respective first and second inductor coil ends 16, 18. In one or more embodiments, the electrical current having a greater magnitude flowing through the crossover intersection 20 of the figure eight configuration thus forces the magnetic fields 24 to form opposing loop formations that are offset from the center of the crossover intersection 20. These opposing magnetic field loop formations that are offset from the center of the crossover intersection 20 thus creates a compact emanating magnetic field 24 that inhibits the magnetic field 24 from emanating in a spurious direction such as following a curved path around the edge 40 of the transmitting antenna 22. Furthermore, interference of the emanating magnetic field 24 with a metallic object or objects (not shown) that may be positioned adjacent to the transmitting antenna 22 is thus minimized or eliminated. As a result, coupling and efficiency between transmitting and receiving antennas 22, 26 is increased. Furthermore, efficiency of wireless electrical energy transfer is increased.

In one or more embodiments, the first and second inductor loops 32, 34 may be electrically connected in series, parallel, or a combination thereof. In general, connecting the inductor loops in electrical series increases inductance and series resistance. Connecting the inductor loops electrically in parallel generally decreases series resistance and inductance. In addition, in one or more embodiments, the first and second inductor coil loops 32, 34 may be positioned in opposition to each other. In one or more embodiments, the first and second inductor coil loops 32, 34 may be positioned diametrically opposed from each other. In one or more embodiments, a crossover angle $\theta$ is created between the first and second filar portions 28, 30. As defined herein, the crossover angle $\theta$ is the angle that extends between the first or second filar portion 28, 30 that extends over the other of the first or second filar portion 28, 30 at the crossover intersection 20. In one or more embodiments, the crossover angle $\theta$ may be about 90°. In one or more embodiments, the crossover angle $\theta$ may be greater than 0° and less than 90°. In one or more embodiments, the crossover angle $\theta$ may be greater than 90° and less than 180°.

Figure 13:
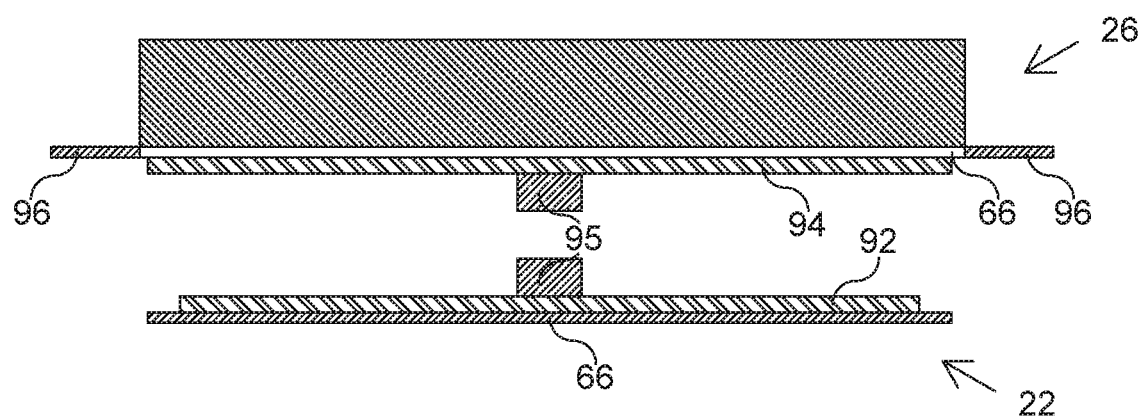
FIG. 13 is a cross-sectional view showing an embodiment of a transmitting antenna spaced from a receiving antenna used for electrical performance testing.

In this application, the subject technology concepts particularly pertain to NFMC. NFMC enables the transfer of electrical energy and/or data wirelessly through magnetic induction between a transmitting antenna 22 and a corresponding receiving antenna 26 (FIG. 13). The NFMC standard, based on near-field communication interface and protocol modes, is defined by ISO/IEC standard 18092. Furthermore, as defined herein "inductive charging" is a wireless charging technique that utilizes an alternating electromagnetic field to transfer electrical energy between two antennas. "Resonant inductive coupling" is defined herein as the near field wireless transmission of electrical energy between two magnetically coupled coils that are tuned to resonate at a similar frequency. As defined herein, "mutual inductance" is the production of an electromotive force in a circuit by a change in current in a second circuit magnetically coupled to the first circuit.

As defined herein a "shielding material" is a material that captures a magnetic field. Examples of shielding material include, but are not limited to ferrite materials such as zinc comprising ferrite materials such as manganese-zinc, nickel-zinc, copper-zinc, magnesium-zinc, and combinations thereof. A shielding material thus may be used to direct a magnetic field to or away from an object, such as a parasitic metal, depending on the position of the shielding material within or nearby an electrical circuit. Furthermore, a shielding material can be used to modify the shape and directionality of a magnetic field. As defined herein a parasitic material, such as a parasitic metal, is a material that induces eddy current losses in the inductor antenna. This is typically characterized by a decrease in inductance and an increase in resistance of the antenna, i.e., a decrease in the quality factor. An "antenna" is defined herein as a structure that wirelessly receives or transmits electrical energy or data. An antenna comprises a resonator that may comprise an inductor coil or a structure of alternating electrical conductors and electrical insulators. Inductor coils are preferably composed of an electrically conductive material such as a wire, which may include, but is not limited to, a conductive trace, a filar, a filament, a wire, or combinations thereof.

It is noted that throughout this specification the terms, "wire", "trace", "filament" and "filar" may be used interchangeably to describe a conductor. As defined herein, the word "wire" is a length of electrically conductive material that may either be of a two-dimensional conductive line or track that may extend along a surface or alternatively, a wire may be of a three-dimensional conductive line or track that is contactable to a surface. A wire may comprise a trace, a filar, a filament or combinations thereof. These elements may be a single element or a multitude of elements such as a multifilar element or a multifilament element. Further, the multitude of wires, traces, filars, and filaments may be woven, twisted or coiled together such as in a cable form. The wire as defined herein may comprise a bare metallic surface or alternatively, may comprise a layer of electrically insulating material, such as a dielectric material that contacts and surrounds the metallic surface of the wire. The wire (conductor) and dielectric (insulator) may be repeated to form a multilayer assembly. A multilayer assembly may use strategically located vias as a means of connecting layers and/or as a means of creating a number of coil turns in order to form customized multilayer multiturn assemblies. A "trace" is an electrically conductive line or track that may extend along a surface of a substrate. The trace may be of a two-dimensional line that may extend along a surface or alternatively, the trace may be of a three-dimensional conductive line that is contactable to a surface. A "filar" is an electrically conductive line or track that extends along a surface of a substrate. A filar may be of a two-dimensional line that may extend along a surface or alternatively, the filar may be a three-dimensional conductive line that is contactable to a surface. A "filament" is an electrically conductive thread or threadlike structure that is contactable to a surface. "Operating frequency" is defined as the frequency at which the receiving and transmitting antennas operate. "Self-resonating frequency" is the frequency at which the resonator of the transmitting or receiving antenna resonates.

In one or more embodiments, the inductor coils 12 of either the transmitting antenna 22 or the receiving antenna 26 are strategically positioned to facilitate reception and/or transmission of wirelessly transferred electrical power or data through near field magnetic induction. Antenna operating frequencies may comprise all operating frequency ranges, examples of which may include, but are not limited to, about 100 kHz to about 200 kHz (Qi interface standard), 100 kHz to about 350 kHz (PMA interface standard), 6.78 MHz (Rezence interface standard), or alternatively at an operating frequency of a proprietary operating mode. In addition, the transmitting antenna 22 and/or the receiving antenna 26 of the present disclosure may be designed to transmit or receive, respectively, over a wide range of operating frequencies on the order of about 1 kHz to about 1 GHz or greater, in addition to the Qi and Rezence interfaces standards. In addition, the transmitting antenna 22 and the receiving antenna 26 of the present disclosure may be configured to transmit and/or receive electrical power having a magnitude that ranges from about 100 mW to about 100 W. In one or more embodiments the inductor coil 12 of the transmitting antenna 22 is configured to resonate at a transmitting antenna resonant frequency or within a transmitting antenna resonant frequency band. In one or more embodiments the transmitting antenna resonant frequency is at least 1 kHz. In one or more embodiments the transmitting antenna resonant frequency band extends from about 1 kHz to about 100 MHz. In one or more embodiments the inductor coil 12 of the receiving antenna 26 is configured to resonate at a receiving antenna resonant frequency or within a receiving antenna resonant frequency band. In one or more embodiments the receiving antenna resonant frequency is at least 1 kHz. In one or more embodiments the receiving antenna resonant frequency band extends from about 1 kHz to about 100 MHz.

Figure 5:
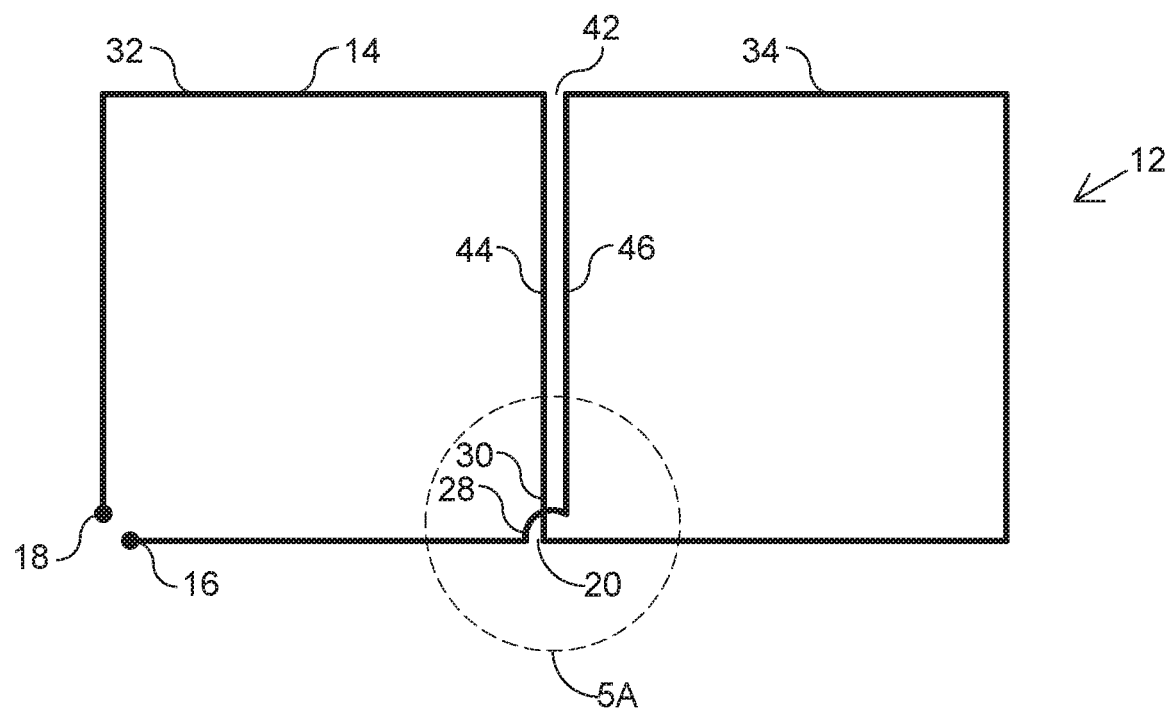
FIG. 5 illustrates an embodiment of an inductor coil with a figure eight configuration of the present application.
Figure 5A:
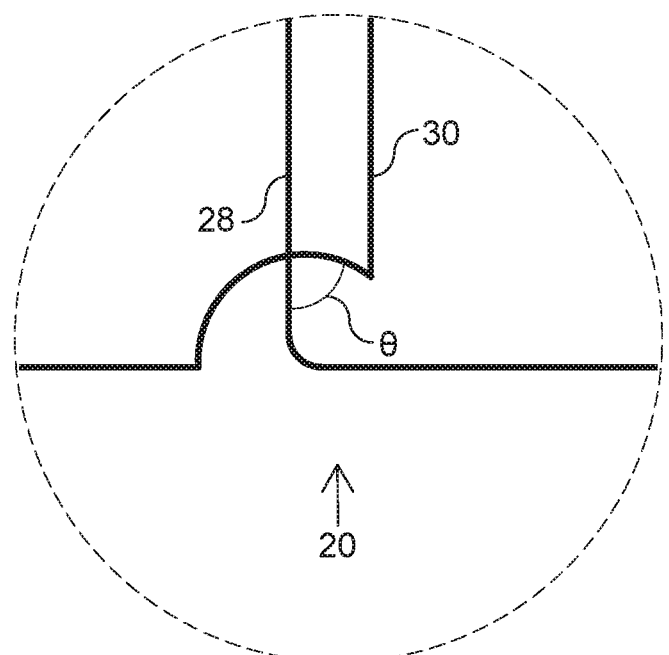
FIG. 5A is a magnified view of the figure eight configuration illustrated in FIG. 5.

FIG. 5 illustrates an embodiment of a "digital" figure eight coil construction. As shown, the inductor coil 12 comprises a crossover intersection 20 forming the first and second coil loops 32, 34. FIG. 5A illustrates a magnified view of an embodiment of the crossover intersection 20 shown in FIG. 5. In one or more embodiments, the inductor coil 12 is constructed such that adjacent segments of the first and second filar portions 28, 30 are positioned about parallel to each other. A digital figure eight gap 42 separates the adjacent segments of the first and second inductor coil loops 32, 34. As shown, a first segment 44 of the first inductor coil loop 32 is positioned parallel to a second segment 46 of the second inductor coil loop 34. Furthermore, the crossover can be used to modify the shape and directionality of a magnetic field for wireless power transfer.

In one or more embodiments, magnetic fields 24 typically combine according to the following mathematical relationship: $I(R_1) + \cos \phi \times I(R_2)$ where $\phi$ is the angle between the electrical current directions $R_1$ and $R_2$ within each of the two inductor coil loops 32, 34. As illustrated in FIG. 5, since the inductor coil 12 comprises a digital figure eight configuration, the angle between the first and second inductor coil loops 32, 34 is 90°. Since the cosine of 90° is 0, the direction of the magnetic field 24 within the digital figure eight inductor coil configuration is in the same direction, $I(R_1)$.

Figure 6:
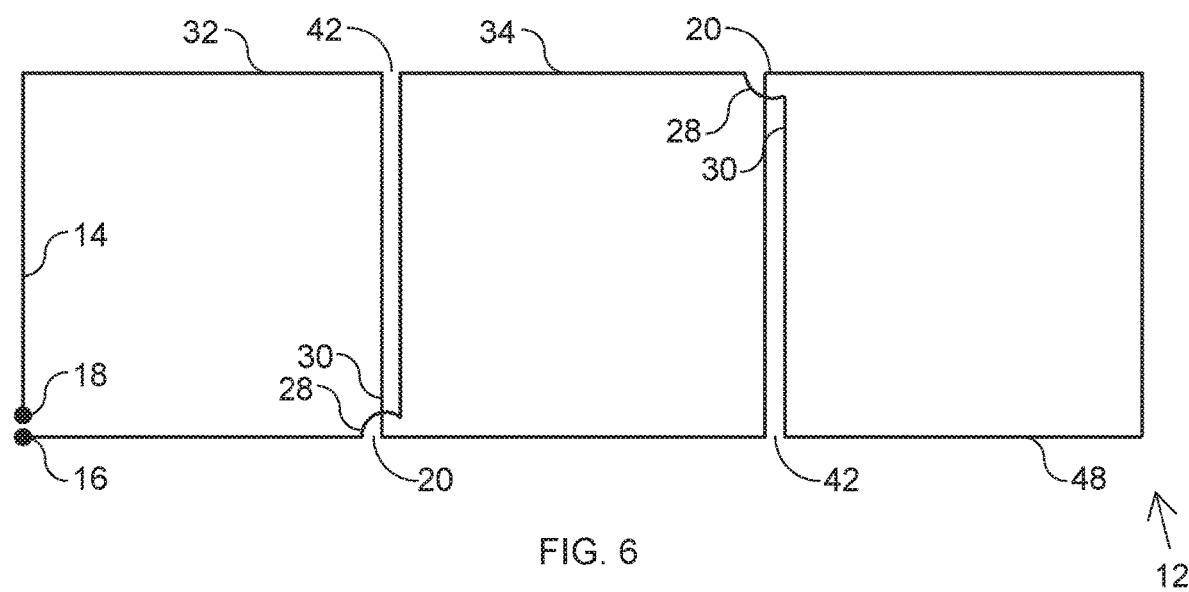
FIG. 6 illustrates an embodiment of an inductor coil of a multiple figure eight configuration of the present application.

FIG. 6 illustrates an embodiment of an inductor coil 12 with a multiple figure-eight configuration. As shown in the embodiment of FIG. 6, the inductor coil 12 comprises two cross over intersections 20 thereby forming three inductor coil loops, a first coil loop 32, a second coil loop 34, and a third coil loop 48. In an embodiment, constructing the inductor coil 12 with a multiple figure eight construction further focuses the emitting magnetic field 24 and further strengthens coupling between the transmitting and receiving antennas 22, 26.

Figure 7:
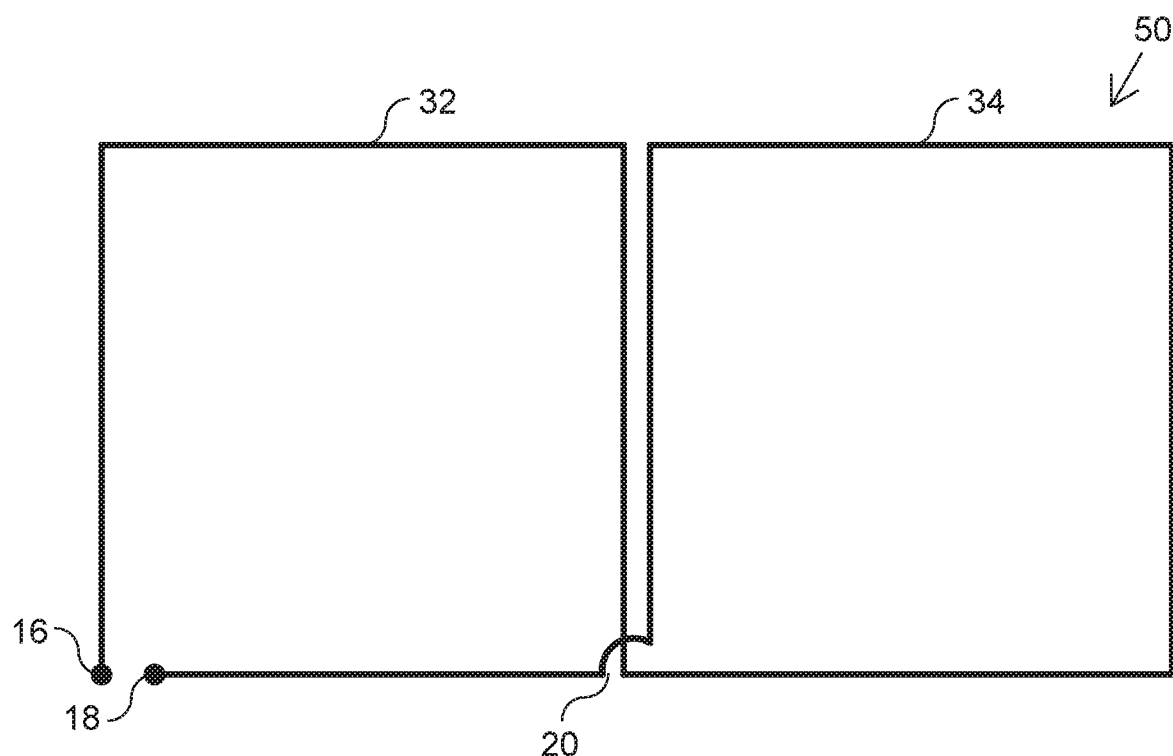
FIG. 7 illustrates an embodiment of an inductor coil with a figure eight configuration of the present application.
Figure 7A:
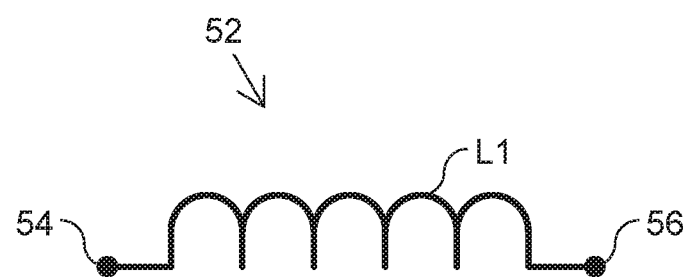
FIG. 7A shows an embodiment of an equivalent circuit of the inductor coil illustrated in FIG. 7.
Figure 8:
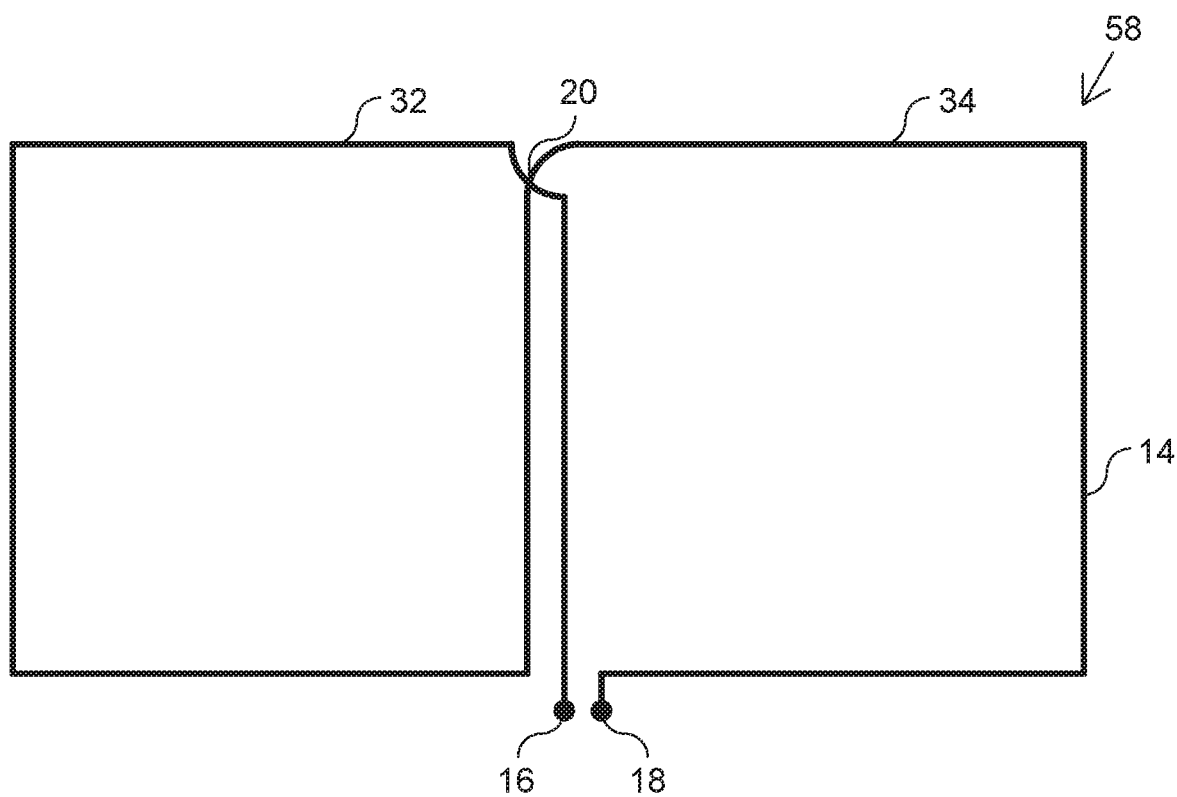
FIG. 8 illustrates an embodiment of an inductor coil with a figure eight configuration of the present application.
Figure 8A:
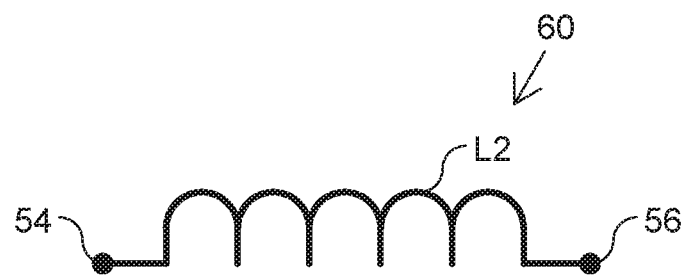
FIG. 8A shows an embodiment of an equivalent circuit of the inductor coil illustrated in FIG. 8.

FIG. 7 illustrates an embodiment of an edge feed inductor coil 50 comprising a figure eight configuration. As defined herein an edge feed inductor coil is an inductor coil configured to either transmit or receive electrical energy via near field communication (NFC) in which the first and second ends 16, 18 of the inductor coil 50 are positioned at a side edge of the transmitting or receiving antenna 22, 26. FIG. 7A shows an embodiment of an equivalent electrical circuit 52 of the inductor coil 50 shown in FIG. 7. As illustrated in FIG. 7A, the equivalent electrical circuit 52 comprises an inductor $L_1$ electrically connected between the first and second terminals 54, 56. In one or more embodiments, as illustrated in FIG. 8, the inductor coil 12 may be configured in a center feed inductor coil 58 configuration. FIG. 8A shows an embodiment of an equivalent electrical circuit 60 of the inductor coil 58 shown in FIG. 8. As illustrated in FIG. 8A, the equivalent electrical circuit 60 comprises an inductor $L_2$ electrically connected between the first and second terminals 54, 56. As defined herein a center feed coil is an inductor coil configured to either transmit or receive electrical energy via NFC in which the first and second ends 16, 18 of the inductor coil 58 are positioned at about the center of the inductor coil 58. In either of the edge feed or center feed inductor coil constructions 50, 58, electrical current flows through the filars 14 of the inductor coils 50, 58 having a parallel orientation in the same direction. In one or more embodiments, the edge feed 50 and/or the center feed 58 inductor coil configurations have two inductor coil loops, a first inductor coil loop 32 and a second inductor coil loop 34 respectively, that carry electrical current in opposite directions to each other. Thus, the effective instantaneous magnetic field direction through the center of each first and second loops 32, 34 of the edge feed inductor coil 50 and the center feed inductor coil 58 is 180° off-phase.

Figure 9:
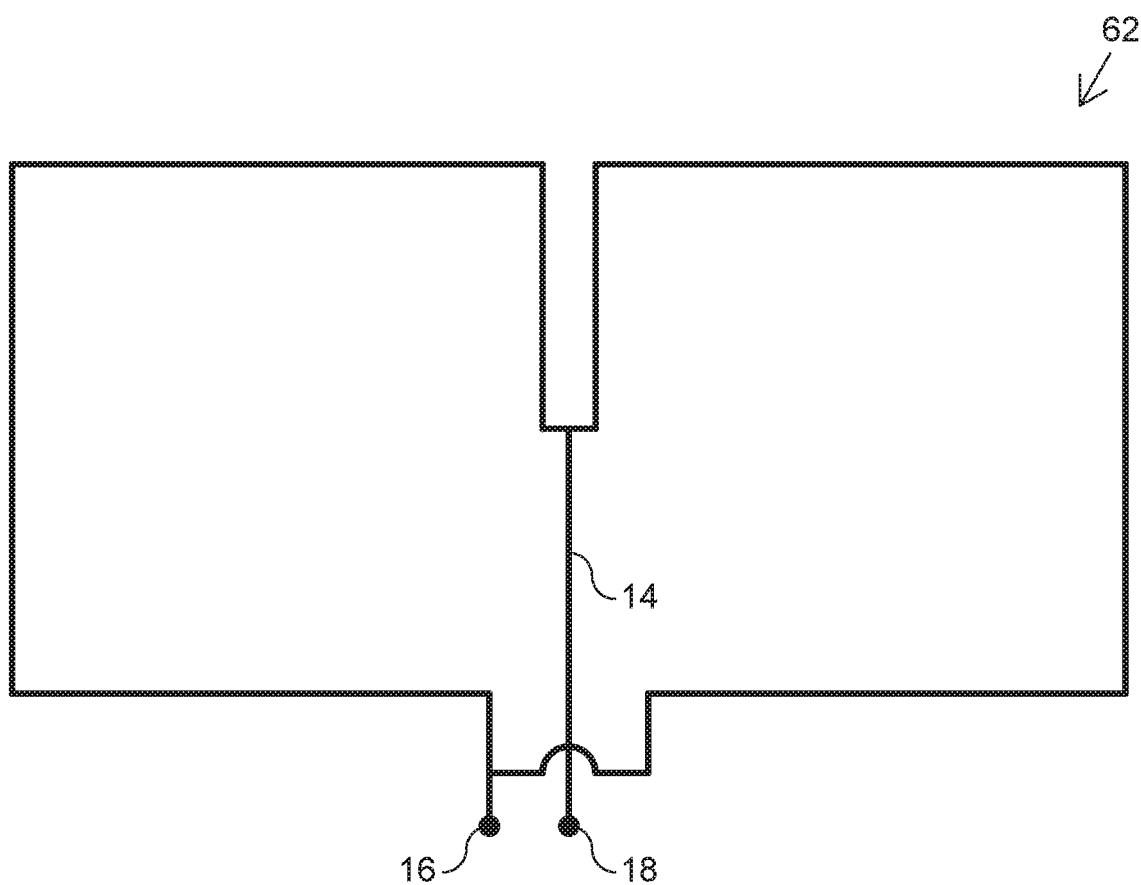
FIG. 9 illustrates an embodiment of an inductor coil with a figure eight configuration of the present application.
Figure 9A:
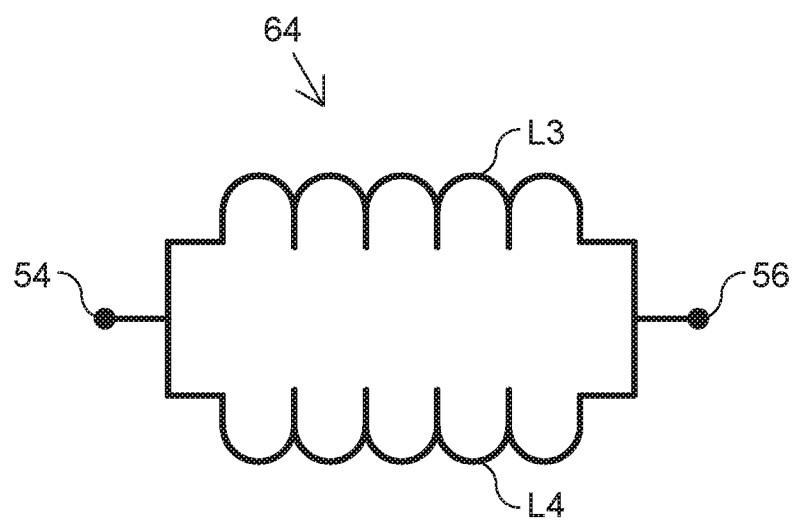
FIG. 9A shows an embodiment of an equivalent circuit of the inductor coil illustrated in FIG. 9.

FIG. 9 illustrates an embodiment of a parallel feed inductor coil 62. In this embodiment, a portion of the filar 14 that comprises the parallel feed inductor coil 62 splits the inductor coil 62 into two inductor coil loops. Similar to the center and edge feed coil configurations 58, 50, electrical current travels in a parallel direction through the two loops of the parallel feed inductor coil configuration 62 shown in FIG. 9. In one or more embodiments, the parallel feed inductor coil configuration 62 helps to reduce the inductance exhibited by the inductor coil 62. FIG. 9A shows an embodiment of an equivalent electrical circuit 64 of the inductor coil 62 shown in FIG. 9. As illustrated in FIG. 9A, the equivalent electrical circuit 64 comprises a first inductor $L_3$ electrically connected in parallel to a second inductor $L_4$, the first and second inductors $L_3$, $L_4$ electrically connected to the first and second terminals 54, 56.

In one or more embodiments, various materials may be incorporated within the structure of the inductor coils 12, 50, 58, 62 of the present application to shield the inductor coils from magnetic fields and/or electromagnetic interference and, thus, further enhance the electrical performance of the respective transmitting or receiving antenna 22, 26.

Figure 22:
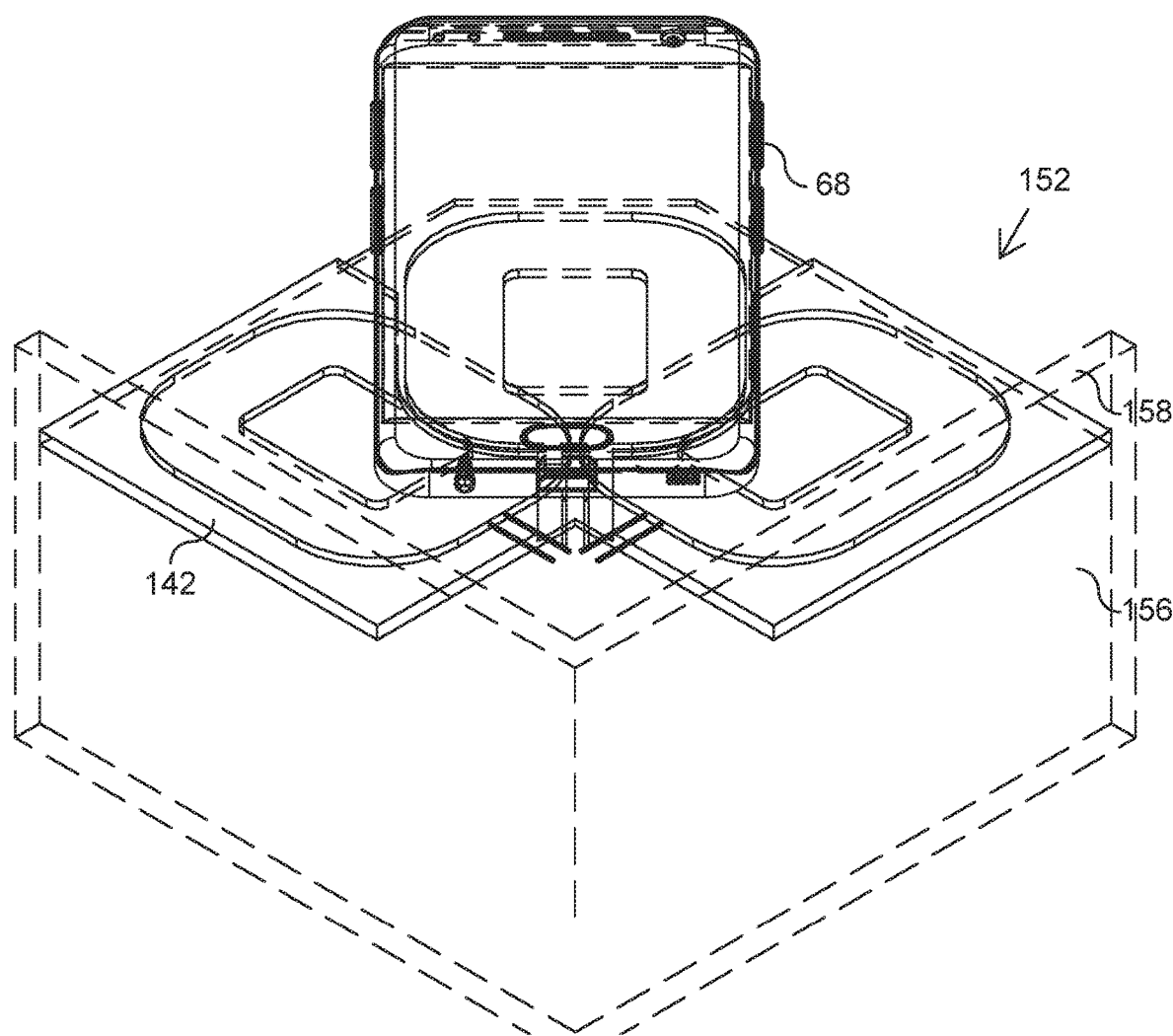
FIG. 22 illustrates an embodiment of an electrical energy transmitting cradle comprising the inductor coil of the present application.

In one or more embodiments, at least one magnetic field shielding material 66, such as a ferrite material, may be positioned about the inductor coil 12 or antenna 22, 26 structure to either block or absorb magnetic fields 24 that may create undesirable proximity effects and that result in increased electrical impedance within the transmitting or receiving antenna 22, 26 and decrease coupling between the transmitting and receiving antennas 22, 26. These proximity effects generally increase electrical impedance within the antenna 22, 26 which results in a degradation of the quality factor. In addition, the magnetic field shielding material 66 may be positioned about the antenna structure to increase inductance and/or act as a heat sink within the antenna structure to minimize over heating of the antenna. Furthermore, such materials 66 may be utilized to modify the magnetic field profile of the antenna 22, 26. Modification of the magnetic field(s) 24 exhibited by the antenna 22, 26 of the present disclosure may be desirable in applications such as wireless charging. For example, the profile and strength of the magnetic field exhibited by the antenna 22, 26 may be modified to facilitate and/or improve the efficiency of wireless power transfer between the antenna and an electric device 68 (FIG. 22) such as a cellular phone. Thus, by modifying the profile and/or strength of the magnetic field about an electronic device being charged, minimizes undesirable interferences which may hinder or prevent transfer of data or an electrical charge therebetween.

Figure 10:
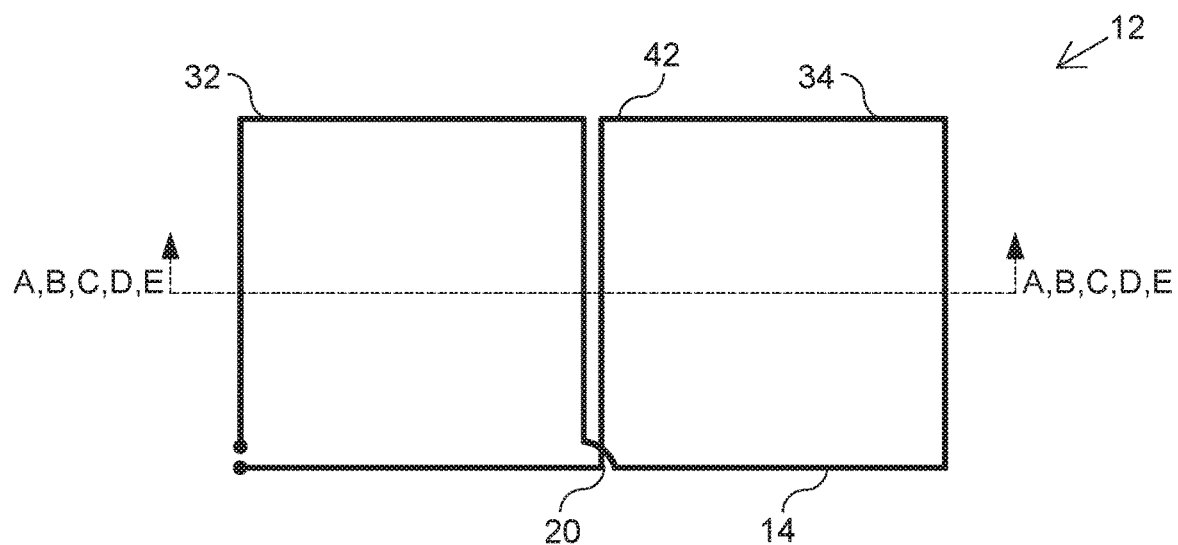
FIG. 10 illustrates an embodiment of an inductor coil with a figure eight configuration of the present application supported on a substrate.
Figure 10A:
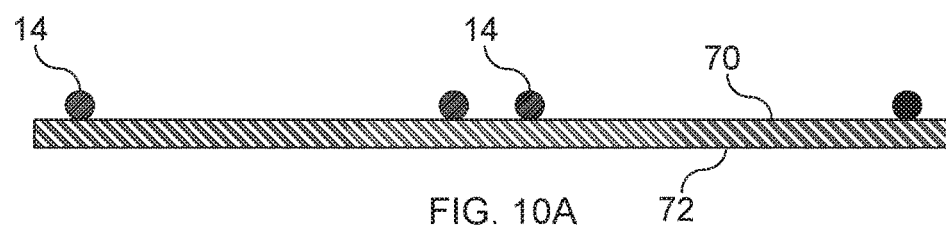
FIGS. 10A-10E are cross-sectional views of embodiments of inductor coils comprising a figure eight configuration with various magnetic field shielding configurations.
Figure 10B:
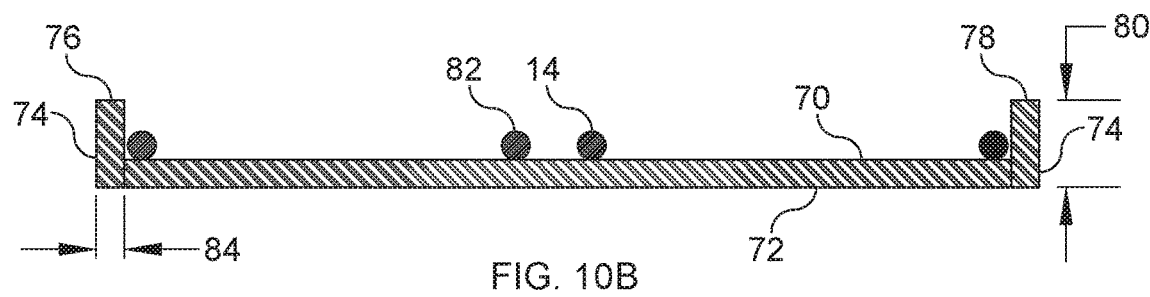
Figure 10C:
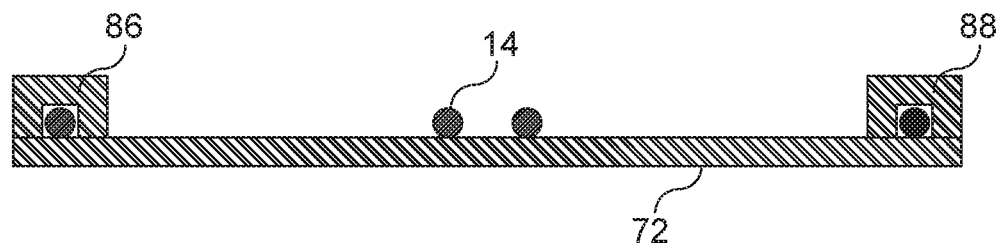
Figure 10D:
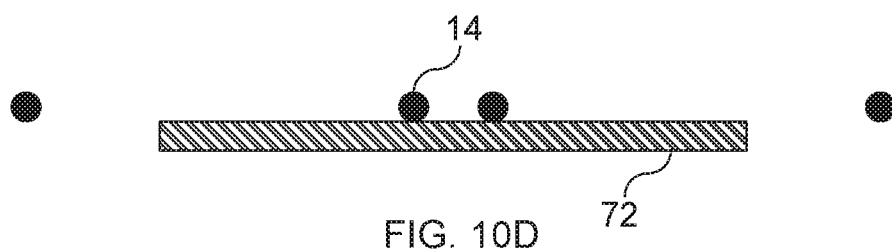
Figure 10E:
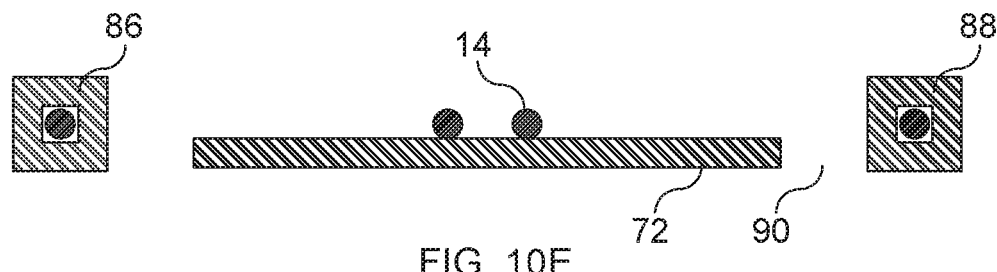

FIGS. 10A, 10B, 10C, 10D, and 10E are cross-sectional views, referenced from the inductor coil 12 configuration shown in FIG. 10, illustrating various embodiments in which magnetic field shielding materials 66 may be positioned about the inductor coil 12. As shown in the cross-sectional view of FIG. 10A, the inductor coil 12 may be positioned on a surface 70 of a substrate 72. In one or more embodiments, the substrate 72 may comprise the magnetic shielding material 66. FIG. 10B is a cross-sectional view of an embodiment in which the inductor coil 12 is positioned on a substrate 72 that comprises end tabs 74. As illustrated, the end tabs 74 upwardly extend from the substrate surface 70 at respective first and second ends 76, 78 of the substrate 72. As illustrated, the end tabs 76, 78 have a height 80 that extends at least to a top surface 82 of the inductor coil 12. As shown, the height 80 of the end tabs 74 extend beyond the top surface 82 of the inductor coil 12. In one or more embodiments, the end tabs 74 have a thickness 84 that extends from about 0.1 mm to about 100 mm FIG. 10C is a cross-sectional view of an embodiment in which the inductor coil 12 may be positioned on a substrate 72 that comprises spaced apart first and second coil enclosures 86, 88. As illustrated, each enclosure 86, 88 extends outwardly from the substrate surface 70 at the respective first and second substrate ends 76, 78. In one or more embodiments, at least a portion of the filar 14 that comprises the inductor coil 12 is positioned within at least one of the enclosures 86, 88. As shown in FIG. 10C the filar 14 forming the outermost segment of the first and second inductor coil loops 32, 34 are positioned within the respective enclosures 86, 88. FIG. 10D is a cross-sectional view of an embodiment in which a portion of the inductor coil 12 is positioned on a substrate 72 comprising the magnetic shielding material 66. As shown, all but the outer most segment of the first and second inductor coil loops 32, 34 are shown supported by the substrate 72. FIG. 10E is a cross-sectional view of an embodiment in which at least a portion of the inductor coil 12 is supported on a substrate 72 comprising the magnetic shielding material 66. In addition, the filar 14 forming the outermost segment of the first and second inductor coil loops 32, 34 are positioned within spaced apart first and second inductor coil enclosures 86, 88. As shown, a gap 90 separates the substrate 72 supporting a portion of the inductor coil 12 from the respective first and second enclosures 86, 88 that house outermost segments of the first and second inductor coil loops 32, 34. In an embodiment, the substrate 72, end tabs 74 and enclosures 86, 88 may comprise at least one magnetic field shielding material 66. It is contemplated that more than one or a plurality of shielding materials may be used in a single structure or on a single layer of a multilayer structure. Examples of the shielding material 66 may include, but are not limited to, zinc comprising ferrite materials such as manganese-zinc, nickel-zinc, nickel-iron, copper-zinc, magnesium-zinc, and combinations thereof. Further examples of shielding material 66 may include, but are not limited to an amorphous metal, a crystalline metal, a soft ferrite material, a hard ferrite material and a polymeric material. As defined herein a soft ferrite material has a coercivity value from about 1 Ampere/m to about 1,000 Ampere/m. As defined herein a hard ferrite material has a coercivity value that is greater than 1,000 Ampere/m. These and other ferrite material formulations may be incorporated within a polymeric material matrix so as to form a flexible ferrite substrate. Examples of such materials may include but are not limited to, FFSR and FFSX series ferrite materials manufactured by Kitagawa Industries America, Inc. of San Jose Calif. and Flux Field Directional RFIC material, manufactured by 3M® Corporation of Minneapolis Minn.

The embodiments shown in FIGS. 10A-10E, illustrate non-limiting configurations that are designed to minimize magnetic fields 24 from moving outward from within the area defined by the inductor coil 12. These illustrated embodiments are designed to help ensure that an increased amount of magnetic fields 24 emanating from the transmitting antenna 22 reach the receiving antenna 26 and do not interfere with adjacently positioned metallic object(s) (not shown) as previously discussed. In one or more embodiments, the magnetic field shielding material 66, such as a ferrite material, may have a permeability (mu') that is greater than 1 at the operating frequency or frequencies of the transmitting antenna 22 and/or the receiving antenna 26. In one or more embodiments, the permeability of the ferrite material may be as great as 20000 at the operating frequency or frequencies of the respective antenna 22, 26. In one or more embodiments, the magnetic shielding material 66 may also comprise an electrically conductive material.

In one or more embodiments, various electrical performance parameters of the wireless electrical energy transmitting and receiving antennas 22, 26 of the present application were measured. One electrical parameter is quality factor (Q) defined below.

The quality factor of a coil defined as:

$$Q = \frac{\omega * L}{R}$$

Where:
Q is the quality factor of the coil
L is the inductance of the coil
ω is the operating frequency of the coil in radians/s. Alternatively, the operating frequency (Hz) may be ω divided by 2π
R is the equivalent series resistance at the operating frequency Another performance parameter is resistance of receiving antenna efficiency (RCE) which is coil to coil efficiency. RCE is defined as:

$$RCE = \frac{k^2 * Q_{Rx} * Q_{Tx}}{(1 + \sqrt{(1 + k^2 * Q_{rx} * Q_{tx})})^2}$$

Where:
RCE is the coil to coil efficiency of the system
k is the coupling of the system
$Q_{rx}$ is the quality factor of the receiver
$Q_{tx}$ is the quality factor of the transmitter Another performance parameter is mutual induction (M). "M" is the mutual inductance between two opposing inductor coils of a transmitting and receiving antenna, respectively. Mutual induction (M) is defined as:

$$M = \frac{V_{induced}}{\omega * I_{Tx}}$$

Where:
$V_{induced}$ is induced voltage on the receiver coil
$I_{tx}$ is the alternating current (AC) flowing through the transmitter coil
ω is the operating frequency multiplied by 2π

Mutual inductance can be calculated by the following relationship:

$$M = k * \sqrt{L_{Tx} * L_{Rx}}$$

Where:
M is the mutual inductance of the system
k is the coupling of the system
$L_{Tx}$ is the inductance of the transmitter coil
$L_{Rx}$ is the inductance of the receiver coil Figure of Merit (FOM) can be calculated by the following relationship:

$$FOM = M^2 \frac{\omega^2}{R_{TX} R_{RX}}$$

Where:
FOM is the figure of merit
ω is the operating frequency in radians
$R_{TX}$ is the AC electrical resistance of the transmitting coil at the operating frequency
$R_{RX}$ is the AC electrical resistance of the receiving coil at the operating frequency
M is the mutual inductance Coil to Coil Efficiency (C2C) can be calculated by the following relationship:

$$C2C \text{ efficiency} = \frac{FOM}{(1 + \sqrt{1 + FOM})^2}$$

Where:
FOM is the figure of merit

Figure 11:
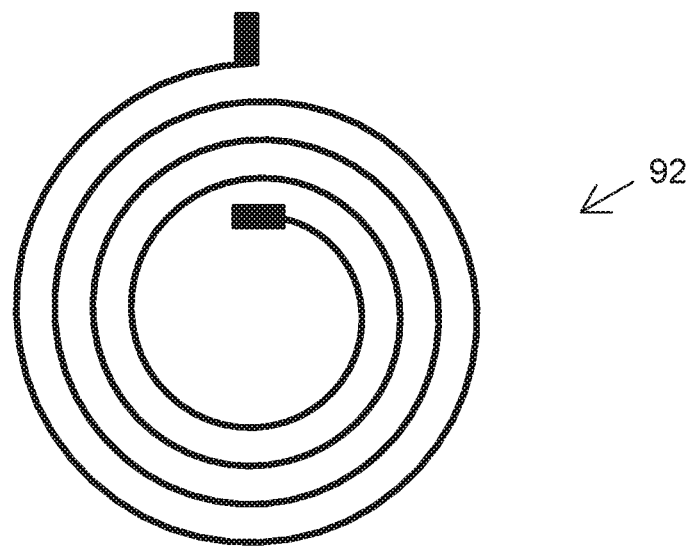
FIGS. 11 and 12 show embodiments of spiral inductor coils that do not have a figure eight configuration.
Figure 12:
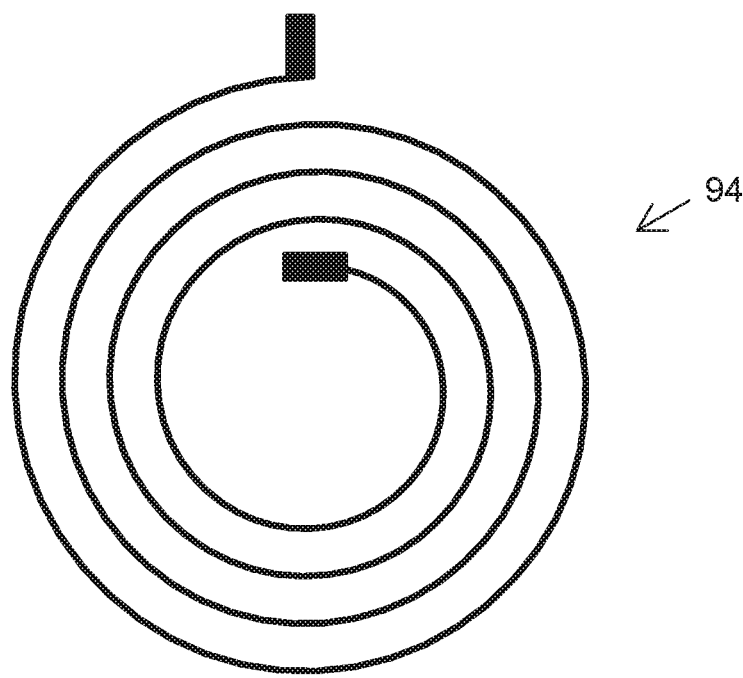

Table I shown below, delineates the inductance (L), electrical resistance (R), and quality factor (Q) of both the transmitting and receiving antennas 22, 26 that comprised an inductor coil configured without the figure eight configuration. FIG. 11 illustrates an embodiment of a transmitting inductor coil 92 that was used in the performance testing detailed in Table I. As shown in FIG. 11, the transmitting inductor coil 92 comprised a spiral configuration having an outer diameter of 27 mm and 5 turns. FIG. 12 illustrates an embodiment of a receiving inductor coil 94 that was used in the performance testing detailed in Table I. As illustrated, the receiving inductor coil 94, comprised a spiral configuration with an outer diameter of 29.4 mm and 4 turns. It is noted that both the transmitting and receiving inductor coils 92, 94 shown in FIGS. 11 and 12 respectively and used in the performance testing detailed in Table I, did not comprise a figure eight configuration. Furthermore, the transmitting antenna 22 comprising the transmitting inductor coil 92 was positioned about 3.5 mm from the receiving antenna 26 that comprised the receiving inductor coil 94 during the performance testing as illustrated in FIG. 13. Configuration 1 comprised the transmitting antenna 22 with only the transmitting inductor coil 92. Configuration 2 included the transmitting inductor coil 92 supported by a core 95 of magnetic field shielding material 66 comprising for example, but not limited to, Mn—Zn, Ni—Zn, soft ferrites, hard ferrites, Mu-Metals, amorphous metal sheets, nano-crystalline metal sheets, polymer based magnetic shielding, and having a thickness of about 0.3 mm. Configuration 3 comprised the receiving antenna 26 with only the receiving inductor coil 94. Configuration 4 comprised the receiving inductor coil 94 supported by the core 95 of magnetic field shielding material comprising materials as discussed for Configuration 2, and having a thickness of about 0.1 mm. Configuration 5 was of the receiving inductor coil 94 supported by the core 95 of magnetic field shielding material comprising materials as discussed for Configuration 2, and surrounded by an aluminum ring 96 having a thickness of about 0.2 mm. FIG. 13 illustrates the performance test configuration with the transmitting antenna 22 configured in configuration 2 and the receiving antenna 26 in configuration 5. The mutual inductance between the transmitting antenna 22 of configuration 2 and the receiving antenna 26 of configuration 4 was about 300.7 nH. The mutual inductance between the transmitting antenna 22 of configuration 2 and the receiving antenna 26 of configuration 5 was about 275 nH. Thus, the metal ring positioned around the circumference of the receiving inductor coil 94 decreased mutual inductance by about 25.7 nH or by about 8.5 percent.

TABLE I

| | L (nH) | R (Ohms) | Q |
|---|---|---|---|
| Transmitting Antenna | | | |
| Configuration 1 | 467 nH | 0.17 | 117 |
| Configuration 2 | 666.3 nH | 0.435 | 65.22 |
| Receiving Antenna | | | |
| Configuration 3 | 618 nH | 0.2 | 131.6 |
| Configuration 4 | 720.7 nH | 0.32 | 154 |
| Configuration 5 | 575 nH | 0.51 | 48 |

As detailed in the test performance results shown in Table I, inclusion of the magnetic field shielding material 66 increased the inductance of both the transmitting and receiving antennas 22, 26. In addition, inclusion of the magnetic field shielding material 66 increased the quality factor of the receiving antenna 26.

Figure 14:
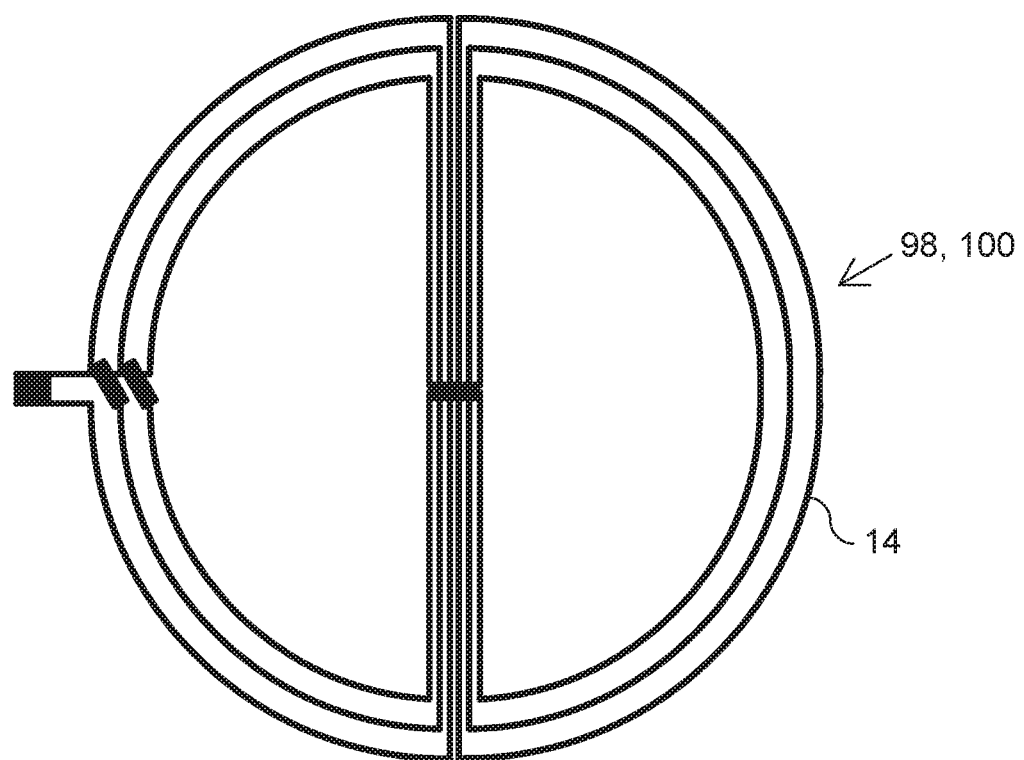
FIG. 14 illustrates an embodiment of an inductor coil with a figure eight configuration of the present application.

Table II shown below delineates the inductance (L), electrical resistance (R), and quality factor (Q) of both the transmitting and receiving antennas 22, 26 that comprised an inductor coil 12 having the figure eight configuration. FIG. 14 illustrates an embodiment of a transmitting inductor coil 98 and a receiving inductor coil 100 utilized in the performance testing detailed in Table II. The transmitting inductor coil 98 comprised a spiral configuration having an outer diameter of 27 mm, 3 turns and a figure eight configuration. The receiving inductor coil 100 also comprised a spiral configuration with an outer diameter of 27 mm, 3 turns, and a figure eight configuration. The transmitting antenna 22 was positioned about 3.5 mm from the receiving antenna 26. Configuration 1 comprised the transmitting antenna 22 with only the transmitting inductor coil 98. Configuration 2 included the transmitting inductor coil 98 supported by a magnetic field shielding material 66 comprising zinc and having a thickness of about 0.3 mm. Configuration 3 was of the receiving antenna 26 comprising only the receiving inductor coil 100. Configuration 4 comprised the receiving inductor coil 100 supported by the magnetic field shielding material composed of nickel, zinc, copper ferrite having a thickness of about 0.1 mm. Configuration 5 was of the receiving inductor coil 100 supported by the ferrite material that was surrounded by an aluminum ring 96 having a thickness of about 0.2 mm. FIG. 13 illustrates the test configuration of the transiting antenna 22 in confirmation 2 and the receiving antenna 26 in configuration 5. The mutual inductance between the transmitting antenna 22 of configuration 2 and the receiving antenna 26 of configuration 4 was about 412 nH. The mutual inductance between the transmitting antenna 22 of configuration 2 and the receiving antenna 26 of configuration 5 was about 411 nH. Thus, the metal ring 96 positioned around the circumference of the receiving inductor coil 100 decreased the mutual inductance by about 1 nH or decreased by about 0.2 percent.

TABLE II

| | L | R (ohms) | Q |
|---|---|---|---|
| Transmitting Antenna | | | |
| Configuration 1 | 805 nH | 0.56 | 61.23 |
| Configuration 2 | 1.135 µH | 0.66 | 73.26 |
| Receiving Antenna | | | |
| Configuration 3 | 805 nH | 0.56 | 61.23 |
| Configuration 4 | 1.1 µH | 0.72 | 65 |
| Configuration 5 | 1 µH | 0.77 | 55.32 |

As detailed in the test performance results shown in Table II, inclusion of the magnetic field shielding material 66 increased the inductance of both the transmitting and receiving antennas 22, 26. In addition, inclusion of the magnetic field shielding material 66 increased the quality factor of the transmitting and receiving antennas 22, 26.

Figure 15:
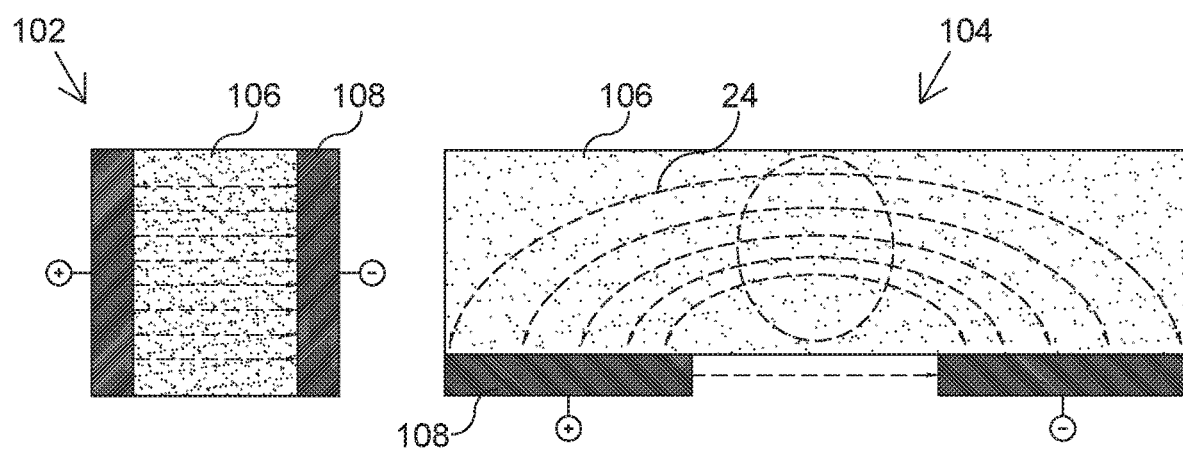
FIG. 15 shows an embodiment of a parallel plate capacitor that may be electrically incorporated with an inductor coil of the present application.

In one or more embodiments a capacitor such as a surface mount capacitor may be electrically connected to the inductor coil 12. In one or more embodiments, a capacitor can be electrically connected to the inductor coil 12 of the transmitting antenna 22 and/or the receiving antenna 26 to adjust the inductance of the inductor coil 12. The capacitor may comprise a parallel plate capacitor 102 and/or an interdigitated capacitor 104. In one or more embodiments, the capacitor, such as a parallel plate capacitor 102 or an interdigitated capacitor 104 may be fabricated on or incorporated within a substrate that supports the inductor coil 12. For example, a parallel plate capacitor 102 or an interdigitated capacitor 104 may be fabricated on or within a printed circuit board (PCB) or flexible circuit board (FCB) to impart a desired capacitance to the transmitting or receiving antenna 22, 26. FIG. 15 illustrates examples of a parallel plate capacitor 102 and an interdigitated capacitor 104. The benefit of utilizing a parallel plate capacitor 102 or an interdigitated capacitor 104 configuration is that they provide a robust thinner design that is generally of a lower cost.

In one or more embodiments, the parallel plate capacitor 102, as shown in FIG. 15, comprises a dielectric material 106 positioned between two opposing electrically conducting plates 108 positioned in parallel to each other.

Figure 16A:
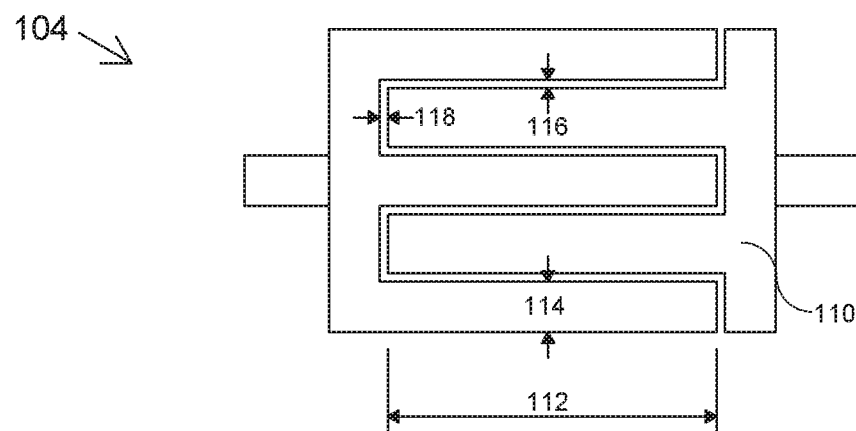
FIGS. 16A-16C illustrate embodiments of an interdigitated capacitor that may be electrically incorporated with an inductor coil of the present application.
Figure 16B:
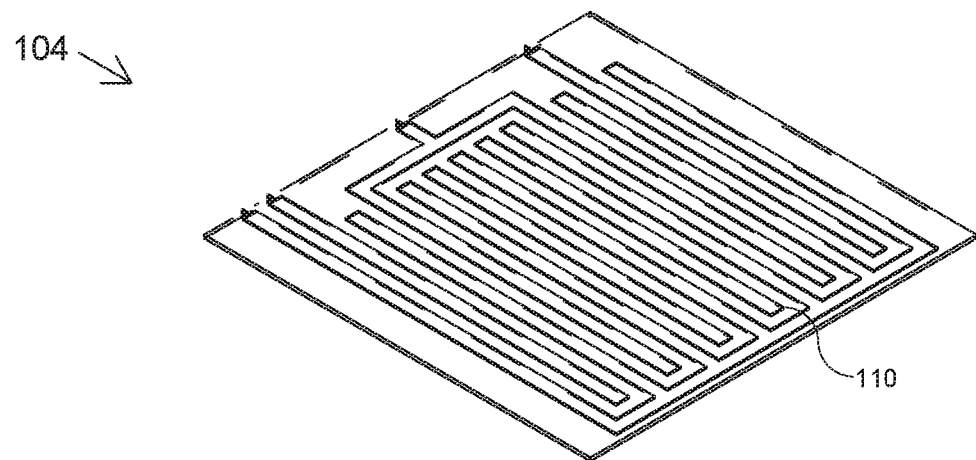
Figure 16C:
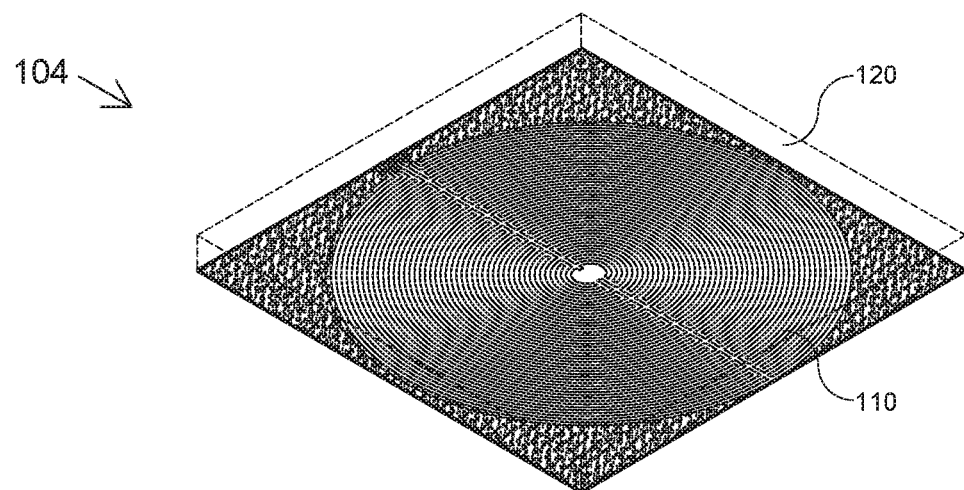

Non-limiting examples of an interdigitated capacitor 104 are shown in FIGS. 15 and 16A-16C. In one or more embodiments, as illustrated in FIGS. 15 and 16A-16C interdigitated capacitors 104 typically have a finger-like shape. In one or more embodiments, the interdigitated capacitor 104 comprises a plurality of micro-strip lines 110 that produce high pass characteristics. The value of the capacitance produced by the interdigitated capacitor 104 generally depends on various construction parameters. These include, a length 112 of the micro-strip line 110, a width 114 of the micro-strip line 110, a horizontal gap 116 between two adjacent micro-strip lines 110, and a vertical gap 118 between two adjacent micro-strip lines 110 (FIG. 16A). In one or more embodiments, the length 112 and width 114 of the miro-strip line 110 can be from about 10 mm to about 600 mm, the horizontal gap 116 can be between about 0.1 mm to about 100 mm, and the vertical gap 118 can be between about 0.0001 mm to about 2 mm.

In one or more embodiments, the inter-digitated capacitor 104 can be integrated within a substrate 120 such as a PCB. In one or more embodiments, the inductor coil 12 may be positioned on the surface of the interdigitated capacitor 104. Alternatively, the inductor coil 12 may be positioned surrounding the interdigitated capacitor 104. In one or more embodiments, the interdigitated capacitor 104 may be positioned within an opening or cavity (not shown) within a substrate 72 supporting the inductor coil 12. In one or more embodiments, the interdigitated capacitor 104 provides a cost-effective means to add capacitance to the inductor coil 12. In addition, the interdigitated capacitor 104 is mechanically durable and may be used to connect a tuned inductor coil 12 directly to a circuit board. In one or more embodiments, interdigitated capacitors 104 can also be useful in applications where relatively thin form factors are preferred. For example, an interdigitated capacitor 104 may be used to tune the inductor coil 12 in lieu of a surface mount capacitor because of the mechanical robustness, relatively thin design, and reduced cost of the interdigitated capacitor 104.

Figure 17:
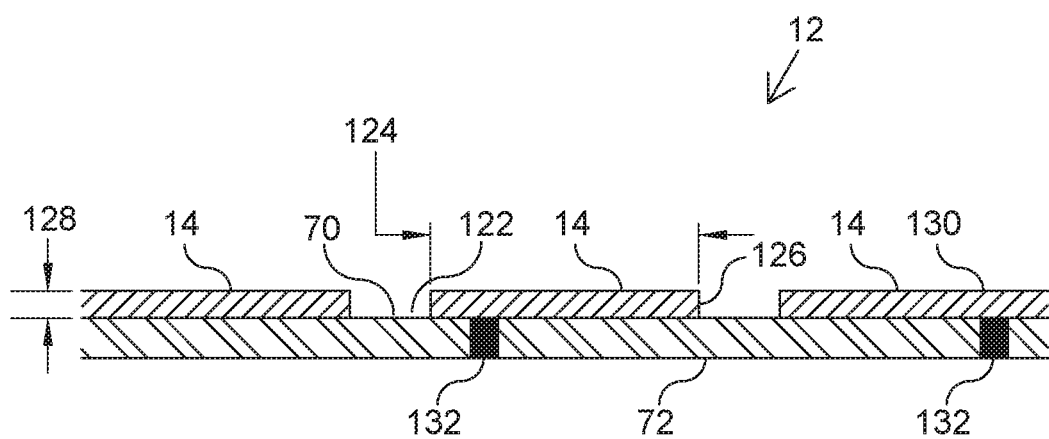
FIG. 17 is a cross-sectional view showing an embodiment of a transmitting or receiving antenna of the present application.

FIG. 17 illustrates a cross-sectional view of one or more embodiments of an inductor coil 12 supported on the surface 70 of a substrate 72. As shown in the embodiment, three sections of filar 14 are illustrated on the surface 70 of the substrate 72. In one or more embodiments, an air gap 122 extends between adjacently positioned sections of filar 14. As shown each of the sections of filar 14 comprises a filar section width 124 that extends about parallel to the surface 70 of the substrate 72 between filar section sidewalls 126. In addition, each of the sections of filar 14 comprise a thickness 128 that extends from the surface 70 of the substrate 72 to a top surface 130 of the filar. In addition, an electrically conductive via 132 is shown electrically connected to the filar 14 extending through the thickness of the substrate 72.

In one or more embodiments, the width of the air gap 122 that extends between sidewalls 126 of adjacently positioned filars 14 is minimized. In one or more embodiments, decreasing the width of the air gap 122 may increase the amount of electrically conductive material that comprises the filar 14 within a defined area. Thus, the amount of electrical current and magnitude of electrical power able to be carried by the inductor coil 12 within a specific area is increased. For example, decreasing the air gap 122 between adjacent filars 14 would enable an increased number of coil turns within a specified area. In one or more embodiments, the width of the air gap 122 may range from about 10 μm to about 50 μm. In one or more embodiments, the width of the air gap 122 may range from about 15 μm to about 40 μm.

In one or more embodiments, the thickness 128 of the filar that extends from the surface 70 of the substrate 72 is maximized. In one or more embodiments, increasing the thickness 128 of the filar 14 increases the amount of electrically conductive material that comprises the filar within a defined area. Thus, the amount of electrical current and magnitude of electrical power able to be carried by the inductor coil 12 is increased within a specific area. In one or more embodiments, the thickness 128 of the filar 14 may vary or be constant along the inductor coil 12. In one or more embodiments, the thickness 128 of the filar 14 may range from about 12 μm to about 150 μm. In one or more embodiments, the width 124 of the filar 14 may vary or be constant along the inductor coil 12. In one or more embodiments, the width 124 of the filar 14 may range from about 10 μm to about 100,000 μm.

In one or more embodiments, the ratio of the width of the air gap 122 to the filar thickness 128 is minimized. In one or more embodiments, the ratio of the width of the air gap 122 to the filar thickness may range from about 0.10 to about 0.50. In one or more embodiments, the ratio of the width of the air gap to the filar thickness may range from about 0.30 to about 0.40.

In one or more embodiments, the sidewall 126 of the filar 14 is oriented about perpendicular to the surface 70 of the substrate 72. In one or more embodiments, the sidewall 126 of the filar 14 may be oriented at a sidewall angle τ with respect to the surface 70 of the substrate 72. As defined herein, the sidewall angle τ is the angle between the exterior surface of the filar sidewall 126 and the surface 70 of the substrate 72 on which the filar 14 is supported. In one or more embodiments, the sidewall angle τ may range from about 75° to about 90°.

TABLE III

| Antenna Config | Inductance (μH) Parameter 1 | ESR (ohms) | Q | Inductance (μH) Parameter 2 | ESR (ohms) | Q |
|---|---|---|---|---|---|---|
| 1 | 5.77 | 0.211 | 17.18 | 5.72 | 0.254 | 14.14 |
| 2 | 5.91 | 0.508 | 7.30 | 5.34 | 0.624 | 5.37 |
| 3 | 5.08 | 0.642 | 4.97 | 3.69 | 0.815 | 2.84 |

Table III above illustrates how the electrical performance of inductance, equivalent series resistance (ESR), and quality factor (Q) change using an air gap of different widths. As shown in Table III above, computer simulations of three different antenna coil configurations were modeled having two different air gap widths. Antenna coil configuration 1 comprised an inductor coil 12 of a rectangular configuration having a length and width of 40 mm and 12 turns. Antenna coil configuration 2 comprised an inductor coil 12 of a circular configuration having an outer diameter of 17 mm. Configuration 2 further comprised two coils, a first coil having 12 turns supported on a top surface of a substrate comprising an electrically insulative material and a second coil comprising 12 turns supported on an opposed bottom surface of the substrate. Antenna coil configuration 3 comprised an inductor coil of a circular configuration having an outer diameter of 17 mm. Configuration 3 further comprised two coils, a first coil having 14 turns supported on a top surface of a substrate comprised of an electrically insulative material and a second coil comprising 14 turns sported on an opposed bottom surface of the substrate. Each of the three antenna coil configurations was modeled having two different air gap widths. Antenna coil configurations 1-3 of Parameter 1 were modeled comprising an air gap width of 0.020 μm whereas antenna coil configurations 1-3 of Parameter 2 were modeled having an air gap width of 0.160 μm. The antenna coil configurations of each parameter comprised the same number of turns but different air gap widths 0.20 μm (Parameter 1) and 0.160 μm (Parameter 2) between adjacent filars 14. As detailed in Table III above, reducing the width of the air gap 122 increased inductance, quality factor, and reduced equivalent series resistance.

Figure 18:
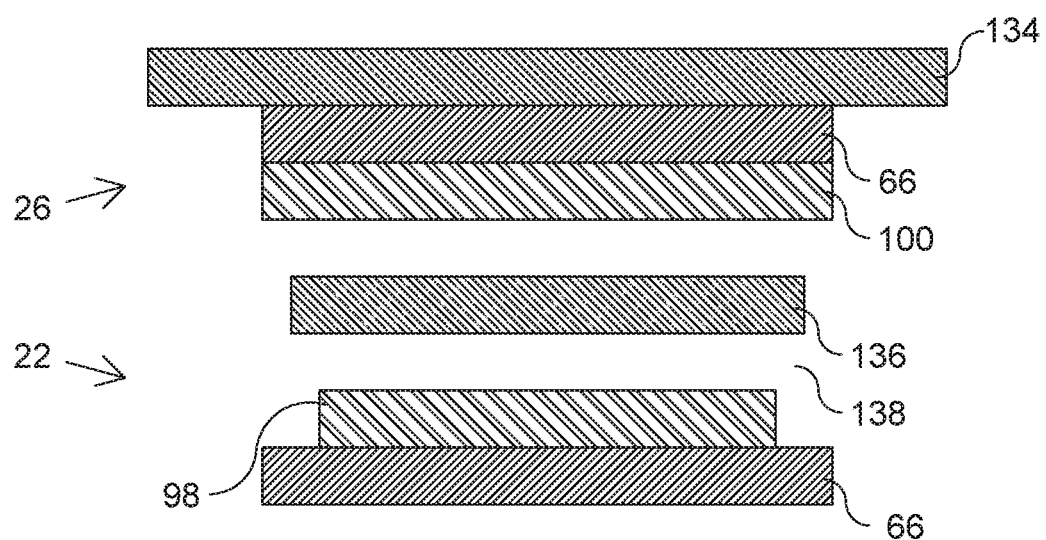
FIG. 18 illustrates an embodiment of a transmitting antenna positioned opposed from a receiving antenna, both the transmitting and receiving antennas comprise magnetic field shielding material.

FIG. 18 illustrates one or more embodiments of a transmitting antenna 22 comprising magnetic field shielding materials 66 positioned opposed and spaced apart from a receiving antenna 26 comprising magnetic field shielding material 66. As illustrated, in the embodiment shown in FIG. 18, the transmitting antenna 22 comprises a transmitting inductor coil 98 having the figure eight configuration supported on a substrate 72 comprising the magnetic field shielding material 66. The receiving antenna 26 positioned spaced from the transmitting antenna 22 comprises a receiving inductor coil 100 with the figure eight configuration. The receiving inductor coil 100 is supported by a substrate 72 comprising the magnetic field shielding material 66. A ground plane 134 comprising an electrically conductive material supports the magnetic field shielding material 66 and the receiving inductor coil 100. A metal ring 136 having an inner circumference about equal to an outer diameter of the transmitting inductor coil 98 is positioned in a gap 138 positioned between the transmitting and receiving antennas 22, 26.

Figure 19:
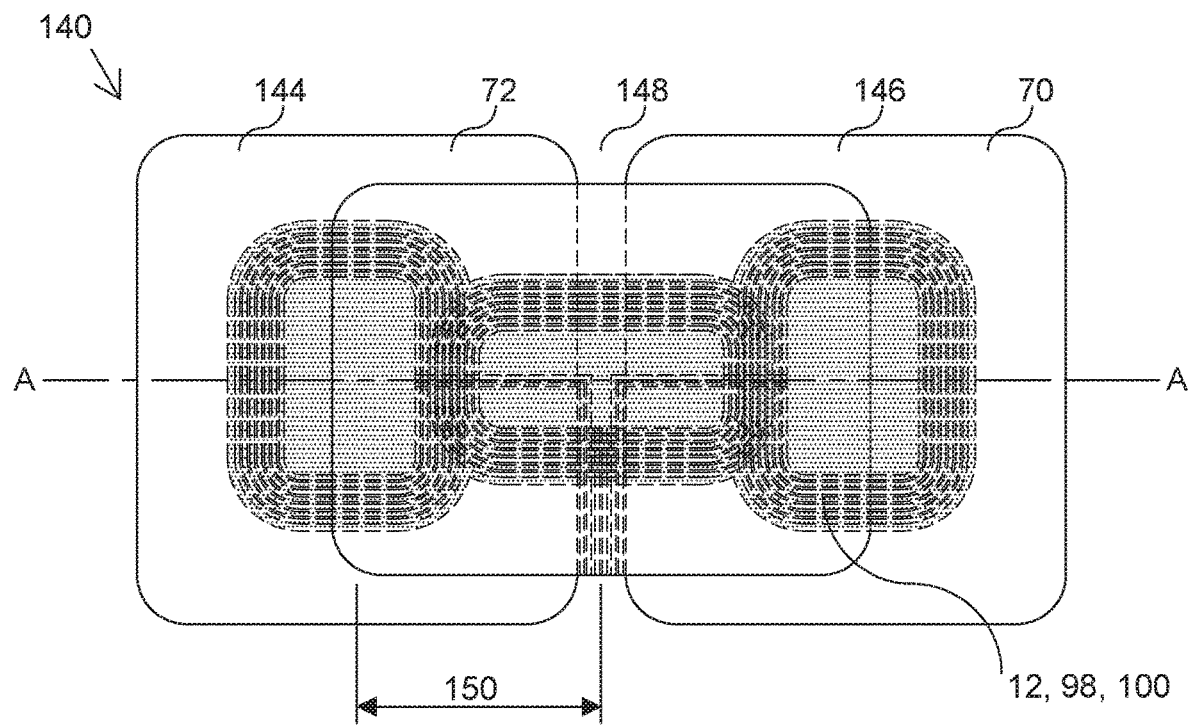
FIGS. 19, 20, and 21 show embodiments of an antenna array of the present application.
Figure 20:
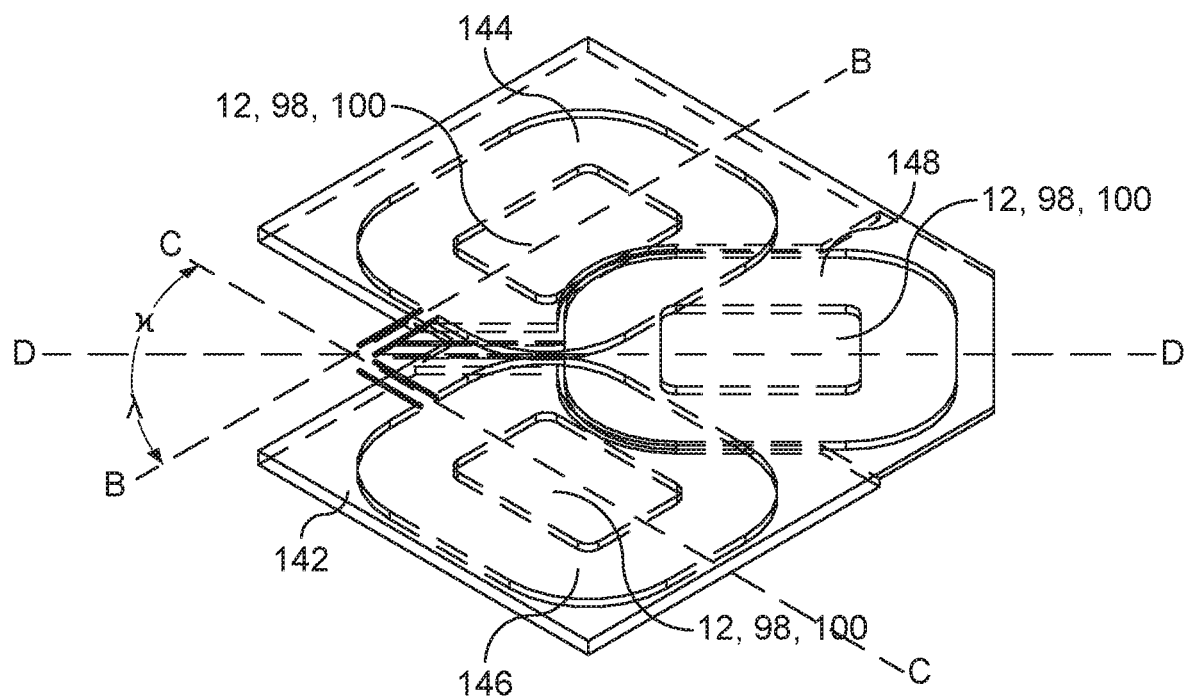

In one or more embodiments the inductor coil 12 and antenna 22, 26 concepts of the present application, may be used to form a multi-antenna array 140 as illustrated in FIGS. 19 and 20. In addition to an inductor coil 12 having a figure eight configuration of the present application, the multi-antenna array 140 may also comprise inductor coils 12 having a variety of non-limiting configurations such as a spiral, a solenoid or combination thereof. Further examples of wireless antenna structures that may be incorporated within the multi-antenna array may include but are not limited to antennas disclosed in U.S. Pat. Nos. and U.S. Pat. Nos. 9,941,729; 9,941,743; 9,960,628; and Ser. Nos. 14/821, 177; 14/821,236; and 14/821,268 all to Peralta et al.; U.S. Pat. Nos. 9,948,129, 9,985,480 to Singh et al.; U.S. Pat. No. 9,941,590 to Luzinski; and U.S. Pat. No. 9,960,629 to Rajagopalan et al., all of which are assigned to the assignee of the present application and incorporated fully herein. Non-limiting examples of antennas having a multilayer multiturn (MLMT) construction that may be incorporated with the present disclosure may be found in U.S. Pat. Nos. 8,610,530; 8,653,927; 8,680,960; 8,692,641; 8,692,642; 8,698,590; 8,698,591; 8,707,546; 8,710,948; 8,803,649; 8,823,481; 8,823,482; 8,855,786; 8,898,885; 9,208,942; 9,232,893; and 9,300,046 all to Singh et al., and assigned to the assignee of the present application are incorporated fully herein. It is also noted that other antennas such as, but not limited to, an antenna configured to send and receive signals in the UHF radio wave frequency such as the IEEE standard 802.15.1 may be incorporated within the present disclosure.

In one or more embodiments, the multi-antenna array 140 of the present application may comprise a multitude of transmitting and/or receiving inductor coils 98, 100 that are positioned embedded within a platform 142 (FIG. 20). In one or more embodiments, the multi-antenna array 140 within the platform 142 is configured so that electrical energy and/or data may be wirelessly transmitted or received to or from at least one electronic device 68, such as a cellular phone. The electrical energy and/or data may be wirelessly transmitted to or received from a respective electronic device 68 by positioning the device 68 on or near the platform 142 in a variety of unlimited positions. For example, an electronic device 68, i.e., a cellular phone or watch, configured with a wireless NFMC receiving antenna 26 may be electrically charged or directly powered by positioning the device 68 in a multitude of orientations with respect to the multi-coil array 142 of the present application. In one or more embodiments, the multi-antenna array is configured having an inductance ranging from about 50 nH to about 50 μH. Thus, the multi-antenna array 140 of the present application may be configured with a multitude of inductor coils 12 that are specifically tuned to a variety of operating frequencies. These frequencies include but are not limited to between 50 kHz to about 500 kHz as well as from about 6.78 MHz to about 276.12 MHz. This, therefore, enables the wireless transmission of electrical energy and/or data to a multitude of unlimited electronic devices 68.

FIGS. 19 and 20 illustrate non-limiting embodiments of the multi-antenna array 140 of the present application. FIG. 19 illustrates an embodiment in which three inductor coils 12, 98, 100 are arranged in a specific pattern. As shown, a first inductor coil 144 and a second inductor coil 146 are positioned parallel and co-planar to each other. A third inductor coil 148 is positioned above the first and second inductor coils 144, 146. As illustrated in the embodiment shown in FIG. 19 the third inductor coil 148 is positioned perpendicular to the first and second inductor coils 144, 146 oriented parallel to each other. In addition, the third inductor coil 148 is positioned extending between and at least partially overlapping the first and second inductor coils 144, 146. An imaginary line A-A extends lengthwise, bisecting the third inductor coil 148. Furthermore, the embodiment of the multi-antenna array shown in FIG. 19 is arranged such that the imaginary line A-A extends widthwise and bisects the first and second inductor coils 144, 146. In one or more embodiments, the multi-antenna array 140 of FIG. 19 may be constructed such that an antenna arrangement distance 150 extends between the bisect of the third inductor coil 148 and either of the bisect of the first or second inductor coils 144, 146 is about equal.

Figure 21:
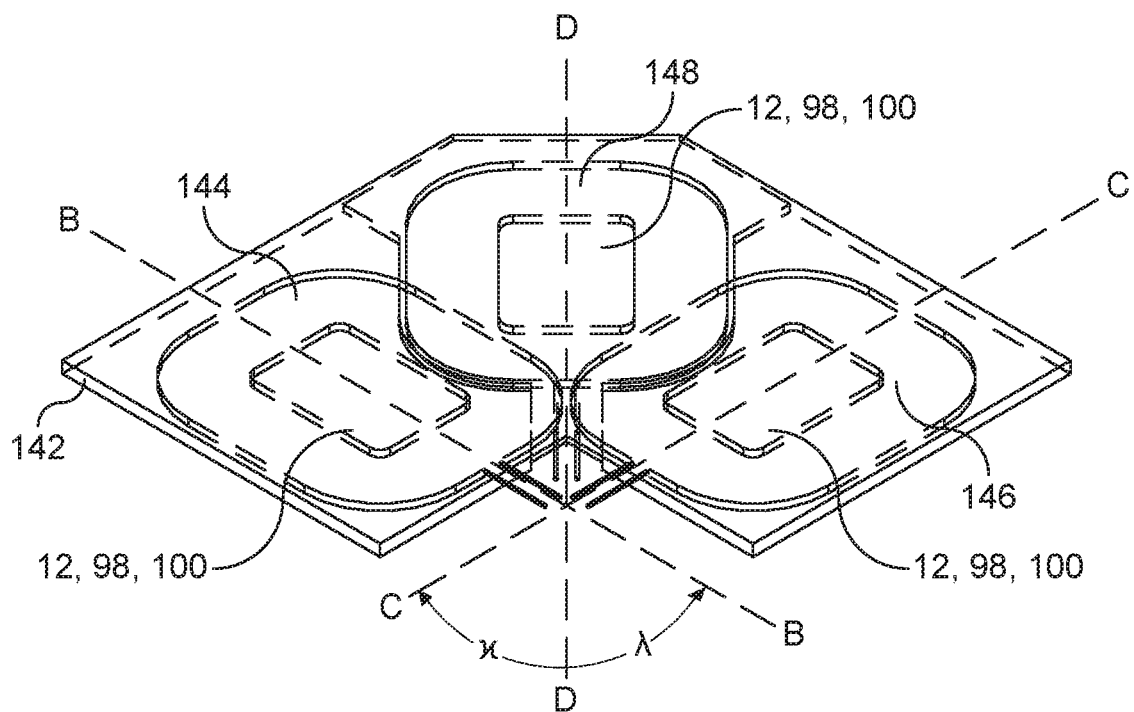

FIGS. 20 and 21 illustrate one or more embodiments of a multi-antenna array 140. As shown, three inductor coils 12, 98, 100 are arranged in a fan-like arrangement. In one or more embodiments as shown in FIGS. 20 and 21, a third inductor coil 148 is positioned between first and second inductor coils 144, 146. In the embodiment shown in FIGS. 20 and 21, the first and second inductor coils 144, 146 are positioned about co-planar to each other. The third inductor coil 148 is positioned in a plane above the first and second inductor coils 144, 146. Alternatively, the third inductor coil 148 may be positioned on a plane below the first and second inductor coils 144, 146. In one or more embodiments, the inductor coils 144, 146, 148 of the multi-antenna array 140 shown in FIGS. 20 and 21 are oriented in an angular relationship with respect to each other. As illustrated an imaginary line B-B extends lengthwise and bisects the first inductor coil 144 of the array 140. A second imaginary line C-C extends lengthwise and bisects the second inductor coil 146 of the array 140. A third imaginary line D-D extends lengthwise and bisects the third inductor coil 148 of the array 140. In one or more embodiments, a first inductor coil array angle γ extends between the imaginary line A-A that extends through the first inductor coil 144 and the imaginary line D-D that extends through the third inductor coil 148. A second inductor coil array angle κ extends between the imaginary line C-C that extends through the second inductor coil 146 and the imaginary line D-D that extends through the third inductor coil 148. In one or more embodiments, at least one of the first and second inductor coil array angles γ,κ may range from about 1° to about 90°. In one or more embodiments, the first and second inductor coil array angles γ,κ may be about equal to each other. In one or more embodiments, the first and second inductor coil array angles γ,κ may not be about equal to each other.

In one or more embodiments, the multi-antenna arrays 140 illustrated in either or both FIG. 19, 20, or 21 may be embedded within a platform 142 or substrate 72. In one or more embodiments, the multi-antenna array 140 may be embedded within the platform 142 such that the top surface of at least one of the inductor coils 144, 146, 148 of the array 140 is positioned flush with the top surface of the platform 142. In one or more embodiments, a potting compound may be used to embed the multi-antenna array 140 within the platform 142 or substrate 72. In one or more embodiments, the potting compound may comprise but is not limited to an adhesive, a thermosetting adhesive, a polymeric material, a thermoplastic polymer, a dielectric material, a metal, or a ceramic material. In one or more embodiments, the potting compound may have a thermal conductivity equal to or greater than 1.0 W/(M·K).

In one or more embodiments, the multi-antenna array 140 of the present application may be configured in a wireless electrical energy transmitting cradle 152 shown in FIGS. 22 and 23A-23D.

In one or more embodiments, as illustrated in FIG. 21, at least one platform 142 comprising the multi-antenna array 140 is electrically configured within the electrical energy transmitting cradle 152. In one or more embodiments, electrical wiring 154 (FIG. 21) connected to each of the inductor coils 144, 146, 148 is electrically connected to a micro-control unit (not shown) residing within the electrical energy transmitting cradle 152. In one or more embodiments, an electrical power source (not shown) is electrically connectable to the micro-control unit and each of the inductor coils 144, 146, 148 of the multi-antenna array 140. In one or more embodiments, the micro-control unit may be configured to detect the presence of an electronic device 68 positioned near at least one of the inductor coils of the multi-antenna array 140. In addition, in one or more embodiments, the micro-control unit is configured to electrically switch between any individual or a combination of inductor coils 144, 146, 148 to ensure proper wireless transmission or reception of electrical energy between the cradle 152 and at least one electronic device 68. Examples of such devices include but are limited to a cellular phone, a computer, a radio, or a wearable electronic device.

As illustrated in FIGS. 22 and 23A-23D, the electrical transmitting cradle 152 comprises at least one platform 142 comprising the multi-antenna array 140. In addition, the electrical transmitting cradle 152 may comprise a housing 156 and at least one sidewall 158. The at least one sidewall 158 is designed to hold the electronic device 68 within the cradle 152 during electrical energy transfer therebetween. In one or more embodiments, the at least one sidewall 158 may comprise at least one multi-antenna array 140 therewithin thereby enabling wireless electrical energy transmission between the cradle 152 and an electronic device 68 positioned therewithin in an unlimited number of orientations with respect to an inductor coil of the array 140. In one or more embodiments, the at least one sidewall 158, multi-antenna array platform 142, and/or housing 156, may be configured with an angular orientation with respect to each other. Thus, the electrical transmitting cradle 152 is designed to be mechanically sturdy and help prevent an electronic device 68 such as a cellular phone from falling off the cradle 152. FIGS. 23A-23D illustrate various non-limiting orientations within which an electronic device 68, i.e., a cellular phone may be positioned within the cradle 152 and still enable wireless transmission of electrical energy and/or data therebetween.

Figure 23A:
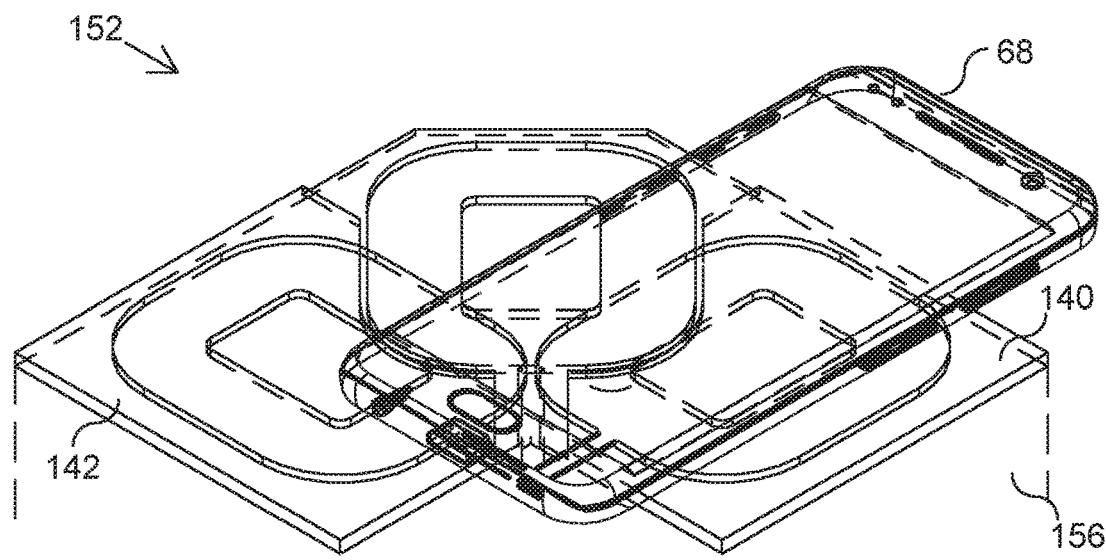
FIGS. 23A-23D illustrate embodiments of an electronic device positioned on the electrical energy transmitting cradle of the present application.
Figure 23B:
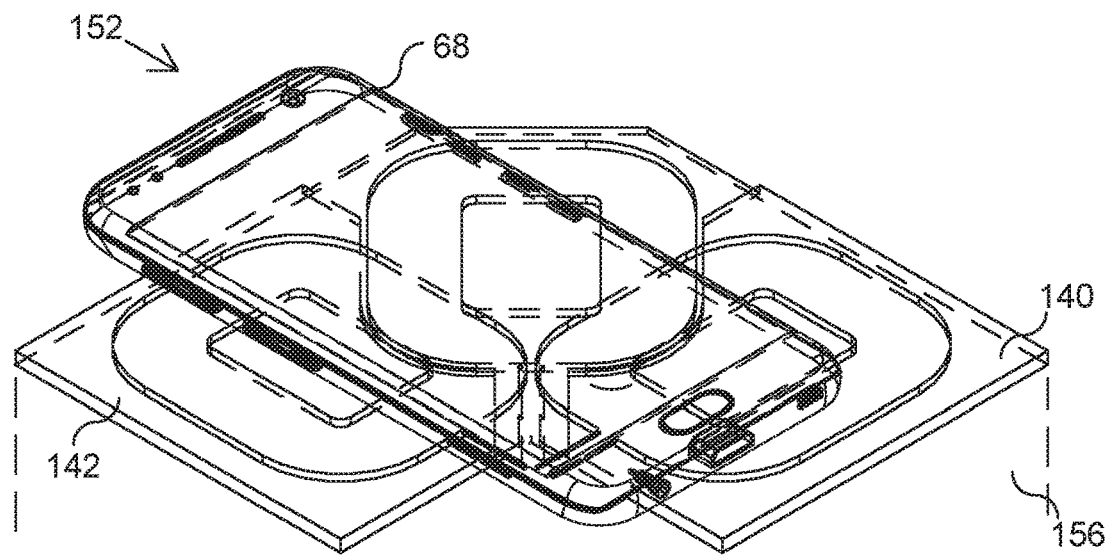
Figure 23C:
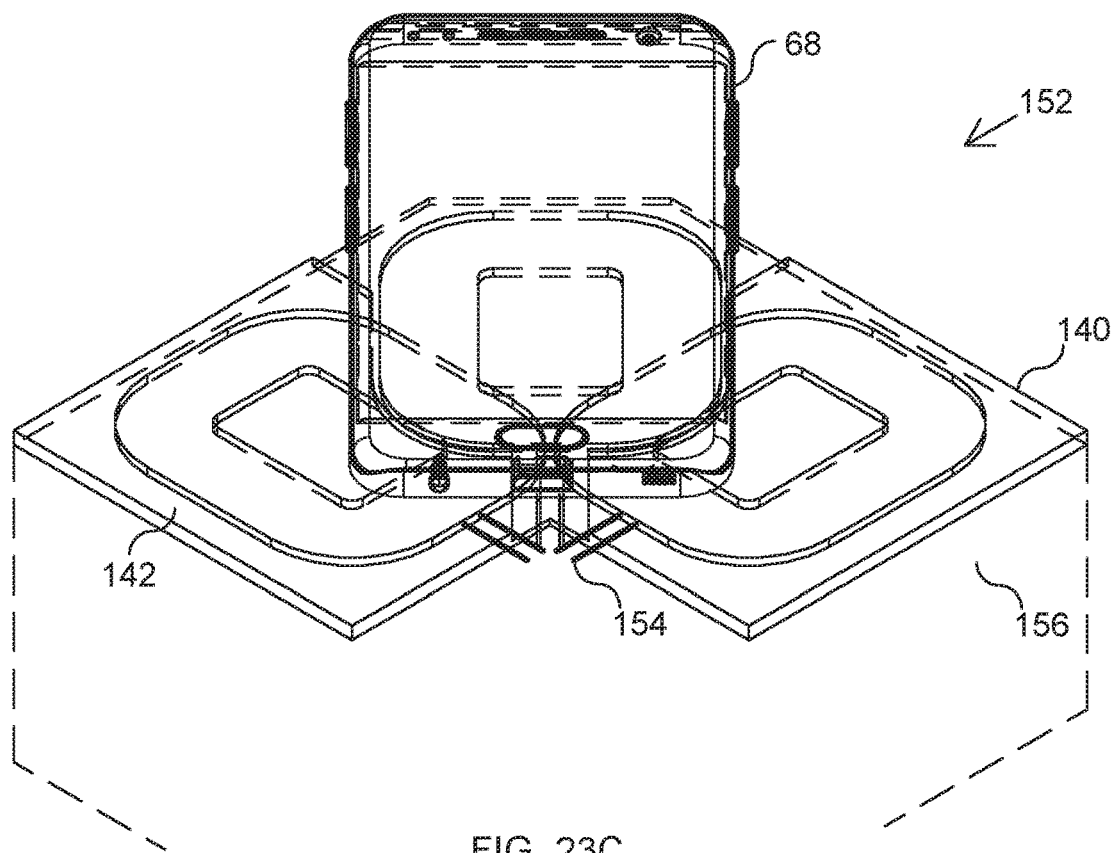
Figure 23D:
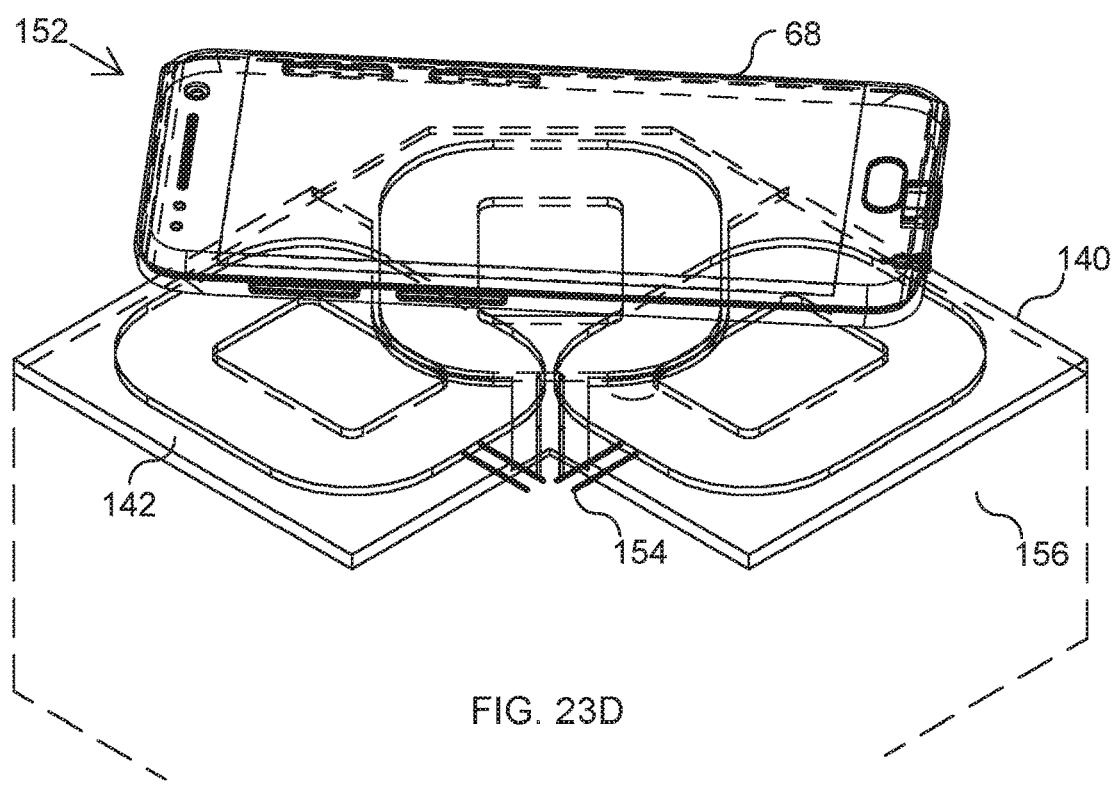
Figure 24:
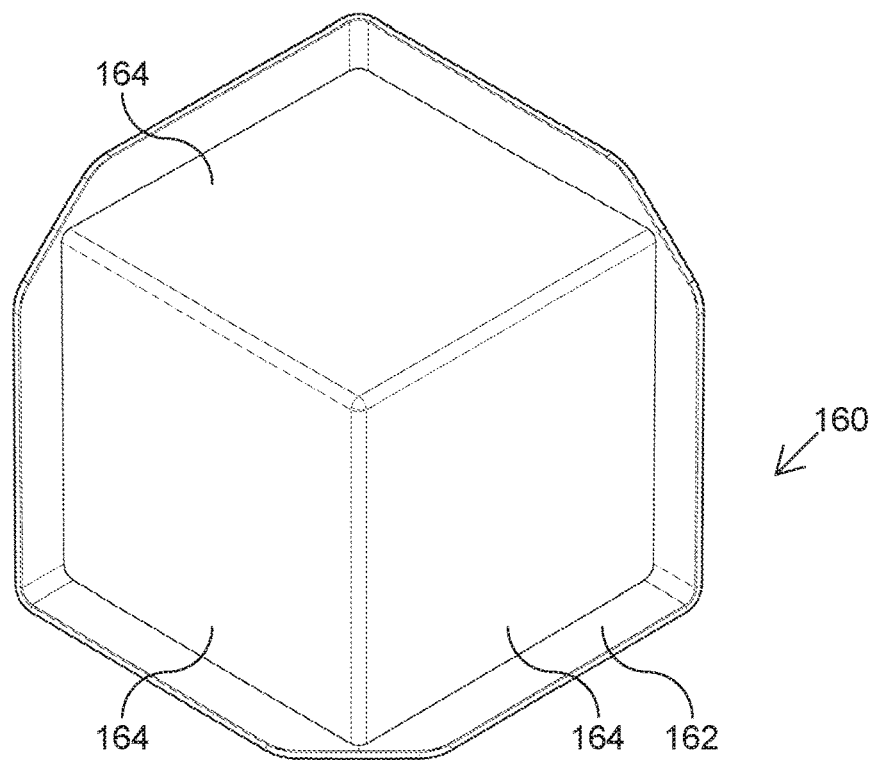
FIG. 24 illustrates an embodiment of an electrical energy transmitting base comprising the inductor coil of the present application.
Figure 24A:
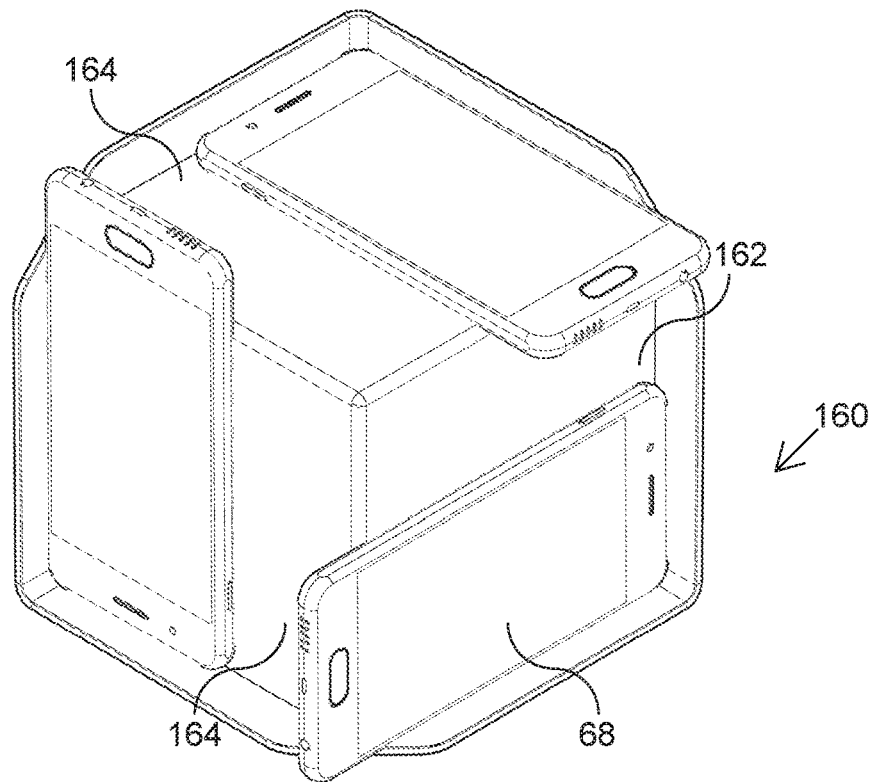
FIG. 24A illustrates an embodiment of an electronic device positioned on the electrical energy transmitting base of the present application shown in FIG. 24.

FIGS. 24, 24A, 25, 26, and 27 illustrate one or more embodiments of a wireless electrical energy transmitting base 160 that comprises the multi-antenna array 140 of the present application. As shown, the wireless transmitting base 160 comprises a base housing 162 and a plurality of wireless transmission surfaces 164 that are positioned about the wireless transmitting base 160. In one or more embodiments, at least one of the multi-antenna array 140 is positioned within the base housing 162. FIG. 23A illustrates an example of an electronic device 68, i.e., a cellular phone, positioned in contact with the transmission surface 164 of the base 160. In one or more embodiments, the wireless energy transmission base 160 is configured so that at least one electronic device 68 is capable of being electrically charged and/or directly powered from electrical energy wirelessly transmitted from the base 160. The at least one electronic device may be positioned in contact with at the least one of the transmission surface 164 or alternatively, the at least one electronic device 68 may be positioned adjacent to but not in direct contact with the at least one of the transmission surface 164.

Figure 25:
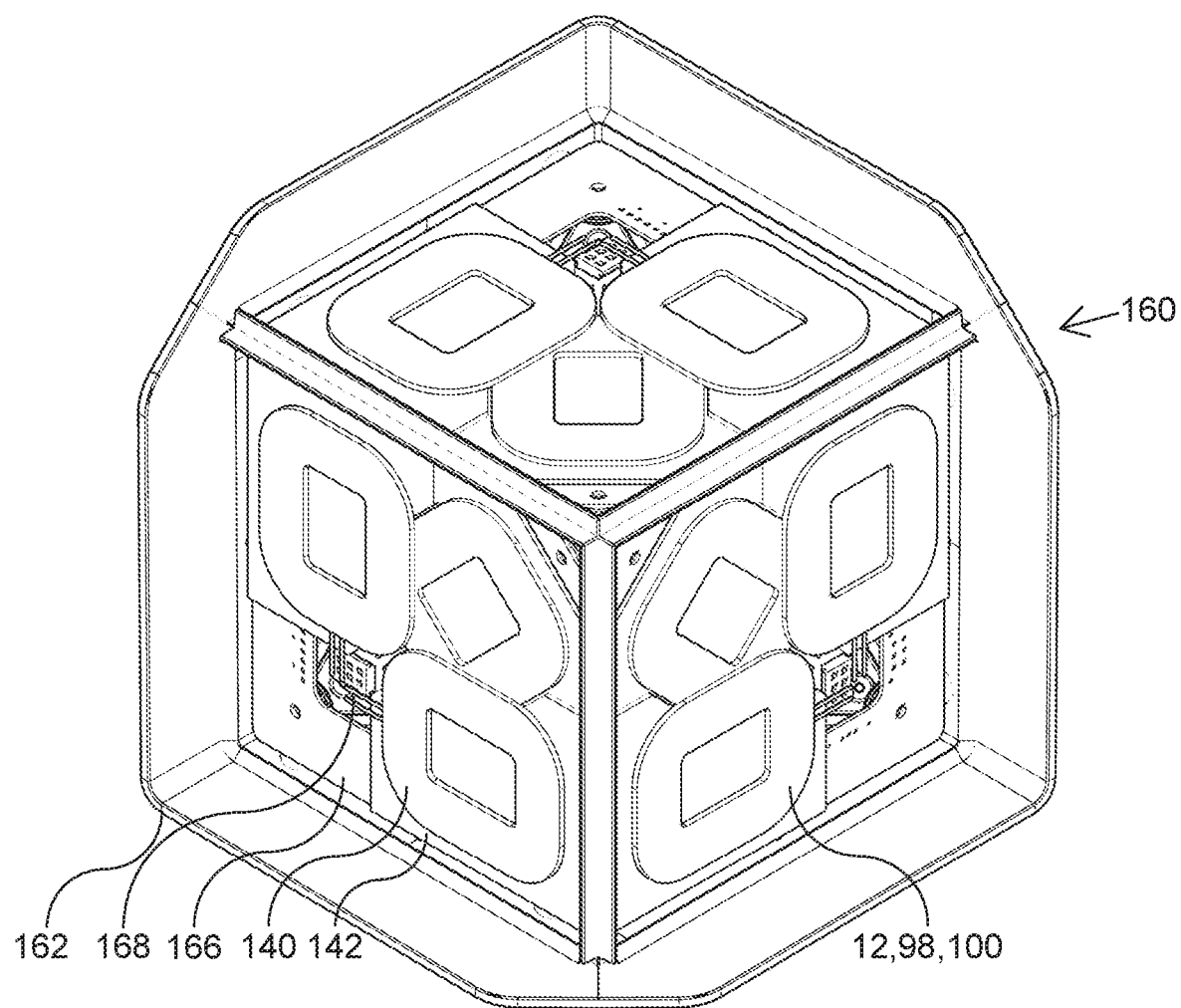
FIGS. 25 and 26 show partially broken views of the electrical energy transmitting base of the present application shown in FIG. 24.
Figure 26:
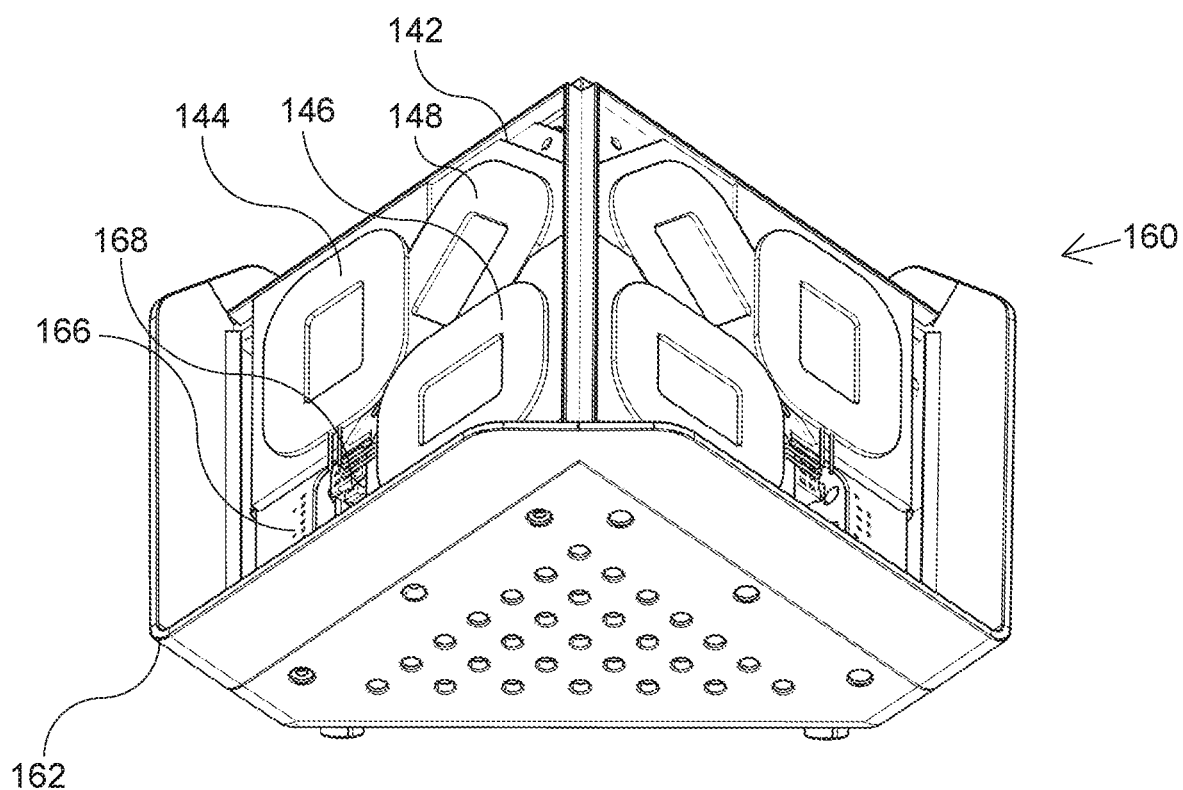
Figure 27:
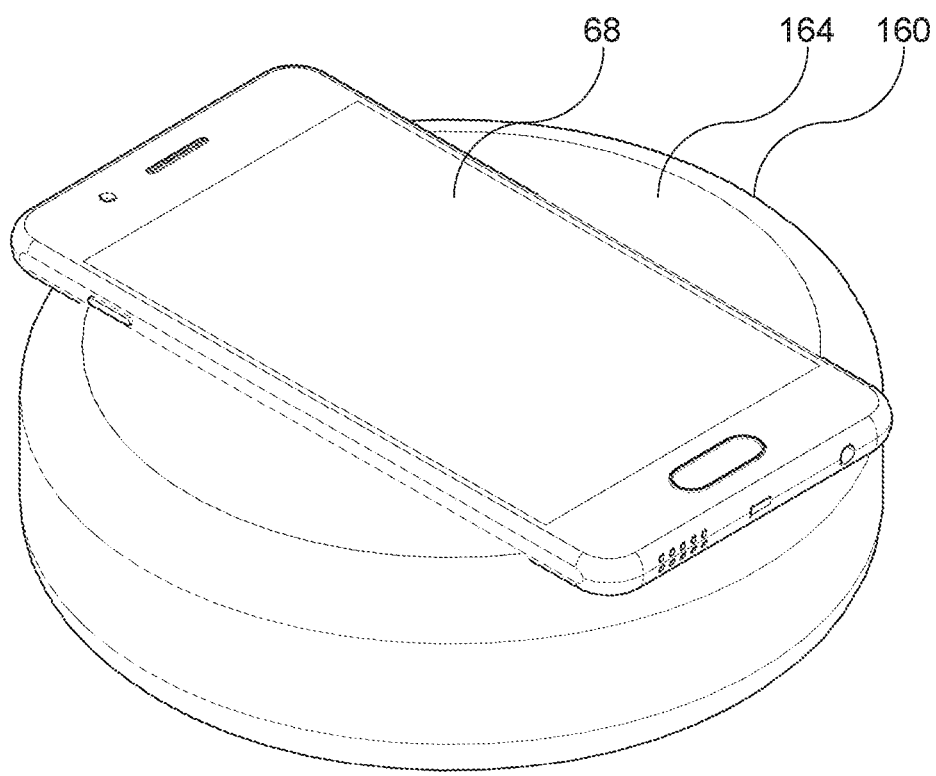
FIG. 27 illustrates an embodiment of an electrical energy transmitting base comprising the inductor coil of the present application.

In one or more embodiments as illustrated in FIGS. 25 and 26, the wireless transmitting base 160 comprises a circuit board 166 positioned within the base housing 162. In one or more embodiments, the circuit board 166 comprises at least one micro-control unit 168 that controls the operation of each of the inductor coils that comprise the multi-antenna array 140 positioned within the base housing 162. In one or more embodiments, the micro-control unit 168 may be configured to switch between each individual or a combination of inductor coils. In one or more embodiments, the micro-control unit 168 may be configured to detect the presence of an electronic device 68 and direct wireless electrical power to the device 68. In one or more embodiments, the micro control unit 168 is configured to direct electrical power to be wirelessly transmitted by controlling various resistors, inductors, and/or capacitors (not shown) within the wireless electrical energy transmitting base 160 to activate or deactivate specific paths of electrical energy within the base 160.

In one or more embodiments either or both the transmitting inductor coil 98 and the receiving inductor coil 100 of the present application may be fabricated using a laser (not shown). In one or more embodiments, the laser may be used to cut the electrically conductive material, thereby forming the filar or wire 14 of the respective inductor coil 12 and further join components together. In one or more embodiments, the laser may be used to cut the electrically conductive material of the coil filar 14 to exacting tolerances. In one or more embodiments, the laser may also be used to join components of the inductor coil and/or antenna 12, 22, 26.

Figure 28A:
Figure 28B:
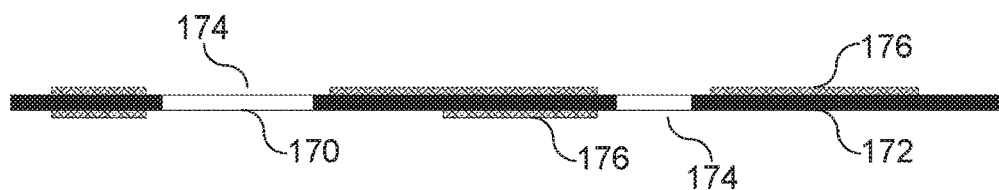
Figure 28C:
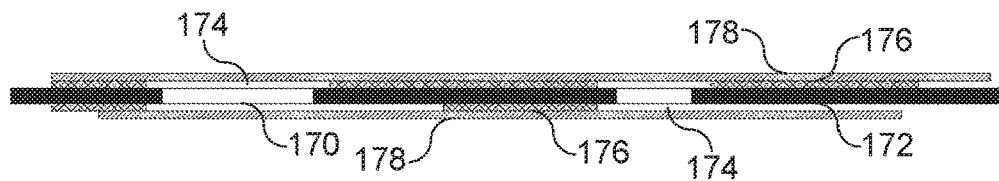
Figure 28F:
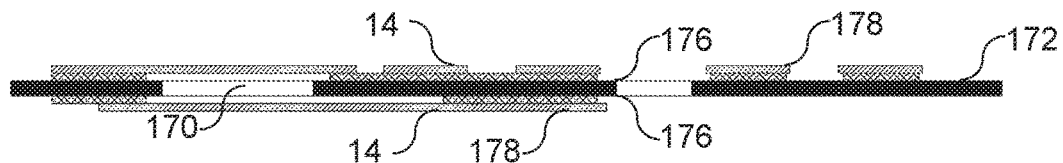
Figure 28F:
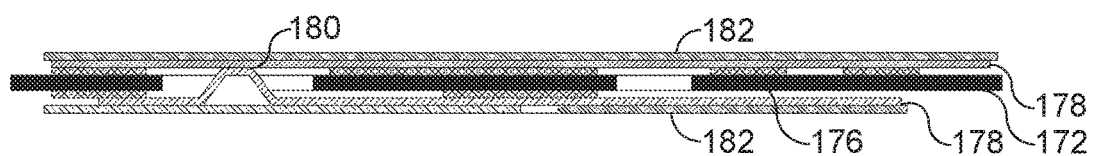
Figure 28G:
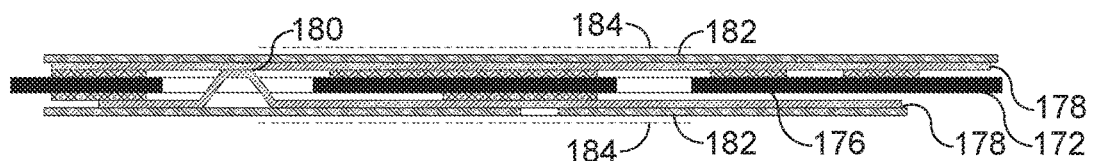

FIGS. 28A-28G and 29A-29C illustrate embodiments of a process of fabricating a transmitting or receiving antenna 22, 26 of the present application. In one or more embodiments, a laser (not shown) may be used to fabricate the antenna. FIG. 28A illustrates step one of the process in which at least o first opening 170 is formed through a substrate 172. In one or more embodiments the substrate 172 is composed of a polymer material. FIG. 28B illustrates an embodiment of step two of the process in which at least one, second opening 174 is formed through an adhesive sheet 176 and placed in contact with either the top or bottom surface of the substrate 172. In one or more embodiments, at least one adhesive sheet 176 is positioned on both the top and bottom surfaces of the substrate 172. In one or more embodiments, the adhesive sheet 176 is positioned on the surface of the substrate 172 so that the second openings 174 of the adhesive sheet 176 align with the first openings 170 of the substrate 172. FIG. 28C illustrates an embodiment of step three of the process in which at least one electrically conductive material 178 such as a metal substrate is positioned on at least the top and bottom surface of the adhesive sheet 176. As illustrated two copper substrates are adhered to the top and bottom surfaces of the adhesive sheet 176. FIG. 28D illustrates step four of the process in which the electrically conductive material is cut into wire or filar 14 strands thereby forming the inductor coil 12. In one or more embodiments, a laser can be used to cut the electrically conductive material into the wire or filar strands 14. FIG. 28E illustrates step five of the process. In one or more embodiments, at least two of the wires or filars 14 are joined together. In one or more embodiments, at least two of the wires or filars 14 are welded together, for example with a laser forming a weld joint 180 therebetween. In one or more embodiments, a protective substrate 182 such as a polymer film is applied to at least the top and top surfaces of the electrically conductive material 178 that forms the filar 14 of the inductor coil 12. FIG. 28G illustrates step six of the process in which a metallic substrate 184 is poisoned in contact with at least one of the top and bottom surfaces of the protective substrate 182. In one or more embodiments, the metallic substrate 184 acts as a barrier to protect the inductor coil 12 from potential damage.

Figure 29A:
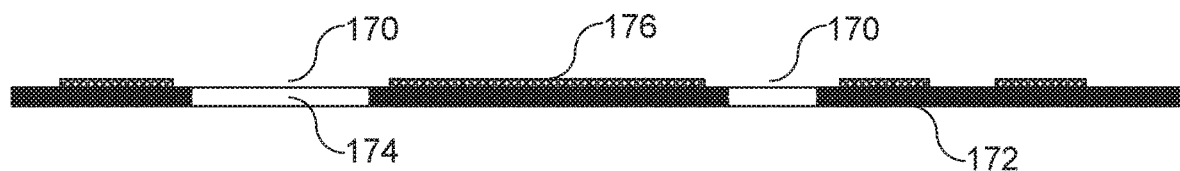
FIGS. 29A-29C illustrates an embodiment of a process of assembling a transmitting or receiving antenna of the present application.
Figure 29B:
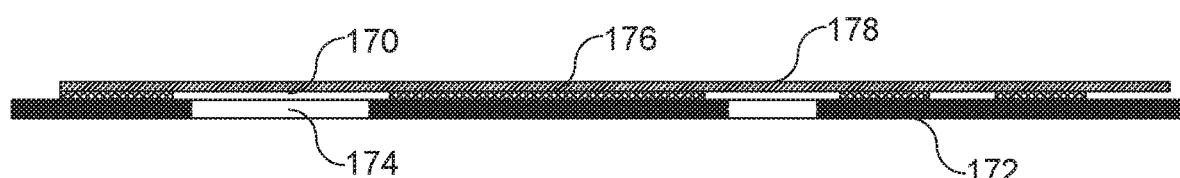
Figure 29C:
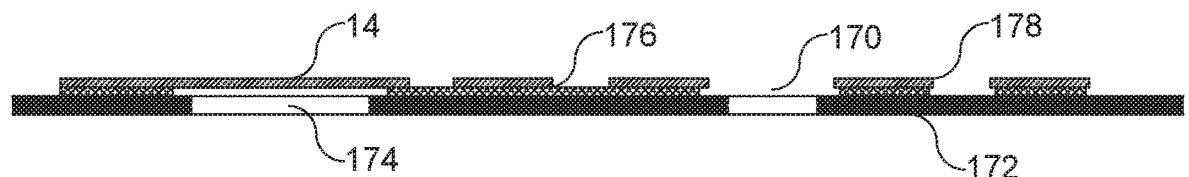

FIGS. 29A-29C illustrate one or more embodiments of a process of fabricating a transmitting or receiving antenna 22, 26 of the present application. FIG. 29A illustrates an embodiment of the first step in the process in which an adhesive sheet 176 comprising at least one first opening 170 is applied to at least the top or bottom surface of a substrate 172 such as a polymer substrate. In one or more embodiments, the substrate 172 has at least one, second opening 174. In one or more embodiments, the first opening 170 of the adhesive sheet 176 aligns with the at least one second opening 174 of the substrate 172. FIG. 29B illustrates an embodiment of step two of the process in which an electrically conductive material 178 such as a metal substrate is positioned in contact with at least one surface of the adhesive sheet 176. FIG. 29C illustrates an embodiment of the third step in the process in which the electrically conductive material 178 is cut to form the wires or filars 14 that comprise the inductor coil 12.

Figure 30:
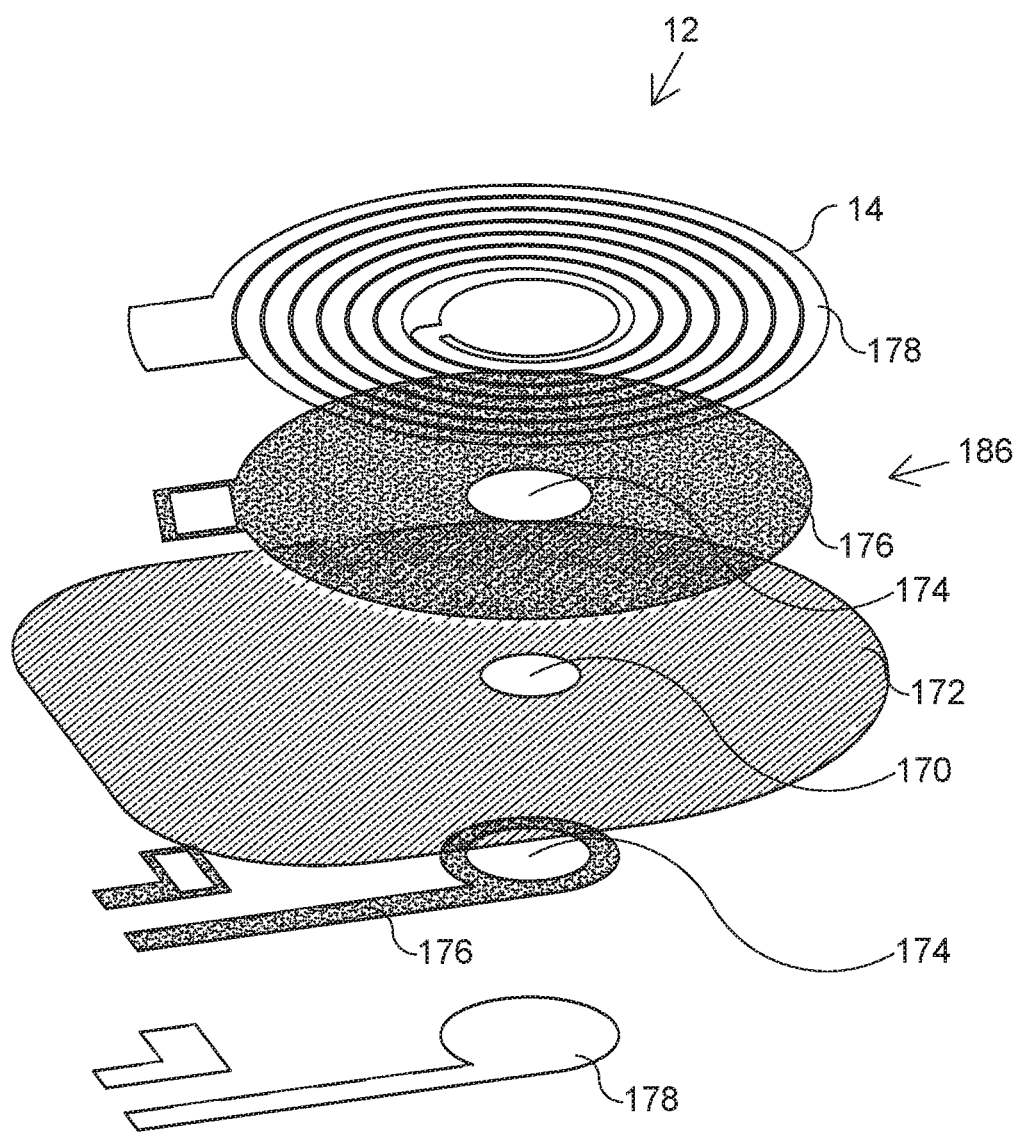
FIG. 30 is an exploded view of an embodiment of a transmitting or receiving antenna of the present application.

FIG. 30 illustrates one or more embodiments of an inductor coil assembly 186 of the present application. As illustrated, the assembly 186 comprises the substrate 172, such as a substrate composed of a polymeric material. The adhesive sheet 176 having an adhesive material on at least one of the top and bottom surfaces is positioned between the substrate 172 and an inductor coil 12 formed from the electrically conductive material 178. The first adhesive sheet 176 configured to adhere the inductor coil 12 to the surface of the substrate 172. A second adhesive sheet 176 is positioned between a second inductor coil 12 and the substrate 172, on the opposite side of the substrate 172.

It will be appreciated that any of the embodiments described herein can be used with multilayer, multilayer multiturn, multimode and similarly configured structures. The following U.S. Patents Nos. and U.S. Patent Application Ser. Nos. are additionally incorporated herein fully by reference: U.S. Pat. Nos. 8,567,048; 8,860,545; 9,306,358; 9,439,287; 9,444,213; and Ser. Nos. 15/227,192; 15/240,637.

Thus, it is contemplated that the embodiments of inductor coils and antennas that enable wireless electrical energy transfer embodiments of the present disclosure may be configured having a variety of configurations. Furthermore, such configurations of the variety of inductor coils and antennas allow for significantly improved wireless transmission of electrical energy and/or data. It is further contemplated that the various magnetic shielding materials 66 can be strategically positioned adjacent to the transmitting or receiving antennas 22, 26 to enhance quality factor and mutual inductance between adjacently positioned transmitting and receiving antennas 22, 26. It is appreciated that various modifications to the subject technology concepts described herein may be apparent to those of ordinary skill in the art without departing from the spirit and scope of the present disclosure as defined by the appended claims.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed:

1. An antenna configured to transmit or receive wireless electrical energy, the antenna comprising:
   a substrate, wherein at least a portion of the substrate comprises a magnetic field shielding material; and
   an electrically conductive filar on the substrate with spaced apart first and second filar ends forming an inductor coil having one or more turns, wherein the inductor coil is configured to generate an inductance at a resonant frequency;
   wherein the electrically conductive filar crosses over itself at a crossover intersection thereby forming a figure eight configuration comprising a first inductor coil loop and a second inductor coil loop positioned side-by-side, wherein the crossover intersection lies between the first inductor coil loop and the second inductor coil loop; and
   wherein the substrate comprises (i) a first enclosure that encloses one portion of the first inductor coil loop while another portion of the first inductor coil loop remains unenclosed and (ii) a second enclosure that encloses one portion of the second inductor coil loop while another portion of the second inductor coil loop remains unenclosed.

2. The antenna of claim 1 wherein a first filar segment of the first inductor coil loop and a second filar segment of the second inductor coil loop are oriented about parallel to each other.

3. The antenna of claim 2 wherein a gap separates the first filar segment and the second filar segment.

4. The antenna of claim 1 wherein the first inductor coil loop comprises a first filar portion and the second inductor coil loop comprises a second filar portion, the inductor coil configured so that an intersection angle extends between the first filar portion and the second filar portion at the crossover intersection.

5. The antenna of claim 4 wherein the intersection angle ranges from 1° to 89°.

6. The antenna of claim 1 wherein a portion of the first inductor coil loop lies within an area formed by the second inductor coil loop or a portion of the second inductor coil loop lies within an area formed by the first inductor coil loop.

7. The antenna of claim 1 wherein the one or more turns comprises at least two turns.

8. The antenna of claim 1 wherein a filar width extends between opposing filar sidewalls each having an exterior sidewall surface and a filar thickness oriented about perpendicular to the filar width extends between top and bottom filar surfaces, wherein a filar sidewall angle extends between a first imaginary line that is co-planar to one of the exterior sidewall surfaces and a second imaginary line that is co-planar to the bottom filar surface.

9. The antenna of claim 8 wherein the filar sidewall angle ranges from 75° to 90°.

10. The antenna of claim 1 further configured within an electronic device.

11. The antenna of claim 1 wherein the resonant frequency ranges from 1 kHz to 100 MHz.

12. The antenna of claim 1 further configured to wirelessly transmit or receive electrical power from 100 mW to 100 W.

13. The antenna of claim 1 wherein a micro control unit is electrically connected to the antenna.

14. The antenna of claim 1 wherein a capacitor is electrically connected to the antenna, the capacitor selected from a group consisting of a surface mount capacitor, a parallel plate capacitor, an interdigitated capacitor, and combinations thereof.

15. The antenna of claim 7 wherein an air gap having an air gap width extends between adjacent inductor coil turns of the at least two turns, wherein the electrically conductive filar has a filar thickness oriented about perpendicular to a filar length that extends between the first and second filar ends, and wherein a ratio of the air gap width to the filar thickness is less than one.

16. The antenna of claim 1, wherein the inductor coil comprises a multilayer multiturn construction.

17. The antenna of claim 1 wherein the crossover intersection is configured to shape magnetic fields for wireless power transfer.

18. The antenna of claim 1 wherein the magnetic shielding material comprises a ferrite material comprising an element selected from a group consisting of zinc, manganese, nickel, iron, magnesium, copper, and combinations thereof.

19. The antenna of claim 1 wherein the magnetic shielding material is selected from a group consisting of an amorphous metal, a crystalline metal, a ferrite material having a coercivity from about 1 Ampere/meter to about 1,000 Ampere/meter, a ferrite material having a coercivity greater than 1,000 Ampere/meter, a polymer material and combinations thereof.

20. The antenna of claim 1 wherein the portion of the substrate comprises a plurality of shielding materials.

21. The antenna of claim 1, wherein:
the enclosed portion of the first inductor coil loop comprises an outermost segment of the first inductor coil loop and the unenclosed portion of the first inductor coil loop comprises an innermost segment of the first inductor coil loop; and
the enclosed portion of the second inductor coil loop comprises an outermost segment of the second inductor coil loop and the unenclosed portion of the second inductor coil loop comprises an innermost segment of the second inductor coil loop.

22. The antenna of claim 21, wherein the innermost segment of the first inductor coil loop and the innermost segment of the second inductor coil loop are arranged on a particular section of the substrate located between the first enclosure and the second enclosure.

23. The antenna of claim 22, wherein:
the substrate comprises a first gap between the particular section of the substrate and the first enclosure; and
the substrate comprises a second gap between the particular section of the substrate and the second enclosure.

24. The antenna of claim 22, wherein the portion of the substrate that comprises the magnetic field shielding material includes at least a portion of the first enclosure, a portion of the second enclosure, and the particular section of the substrate.

25. The antenna of claim 1, wherein the portion of the substrate that comprises the magnetic field shielding material includes at least a portion of the first enclosure and a portion of the second enclosure.

* * * * *